US012756849B2

(12) United States Patent
Gan et al.

(10) Patent No.: US 12,756,849 B2
(45) **Date of Patent: *Oct. 6, 2026**

(54) SIGNALING GENERAL CONSTRAINTS INFORMATION IN METHOD FOR DECODING VIDEO, METHOD: FOR ENCODING VIDEO, AND NON-TRANSITORY COMPUTER-READABLE MEDIUM

(71) Applicant: GUANGDONG OPPO MOBILE TELECOMMUNICATIONS CORP., LTD., Dongguan (CN)

(72) Inventors: Jonathan Gan, Palo Alto, CA (US); Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/726,989

(22) PCT Filed: Nov. 8, 2022

(86) PCT No.: PCT/US2022/079487
§ 371 (c)(1),
(2) Date: Jul. 5, 2024

(87) PCT Pub. No.: WO2023/132991
PCT Pub. Date: Jul. 13, 2023

(65) Prior Publication Data

US 2025/0159223 A1 May 15, 2025

Related U.S. Application Data

(60) Provisional application No. 63/266,765, filed on Jan. 13, 2022, provisional application No. 63/266,616,
(Continued)

(51) Int. Cl.
*H04N 19/44* (2014.01)
*H04N 19/124* (2014.01)
(Continued)

(52) U.S. Cl.
CPC ........... *H04N 19/44* (2014.11); *H04N 19/124* (2014.11); *H04N 19/184* (2014.11); *H04N 19/46* (2014.11); *H04N 19/70* (2014.11)

(58) Field of Classification Search
CPC .... H04N 19/44; H04N 19/124; H04N 19/184; H04N 19/46; H04N 19/70; H04N 19/103;
(Continued)

(56) References Cited

U.S. PATENT DOCUMENTS

| | | | |
|---|---|---|---|
| 11,838,554 | B2 | 12/2023 | Deng et al. |
| 11,889,119 | B2 | 1/2024 | Deng et al. |

(Continued)

FOREIGN PATENT DOCUMENTS

| | | |
|---|---|---|
| CN | 104284191 | 1/2015 |
| CN | 107801095 | 3/2018 |

(Continued)

OTHER PUBLICATIONS

Bossen et al., "VVC operation range extensions (Draft 5)," Joint Video Experts Team (JVET) of ITU-T SG 16 WP 3 and ISO/IEC JTC 1/SC 29, Document: JVET-X2005-v1, Oct. 2021.

(Continued)

*Primary Examiner* — Richard A Hansell, Jr.
(74) *Attorney, Agent, or Firm* — Hodgson Russ LLP

(57) ABSTRACT

A method for decoding a video includes: extracting a GCI flag from a bitstream of the video; determining that one or more general constraints are imposed for the video based on a value of the GCI flag; in response to determining that one or more general constraints are imposed for the video, extracting, from the bitstream of the video, a value indicat-
(Continued)

ing a quantity of additional bits included in the bitstream, the additional bits comprising flag bits indicating respective additional coding tools to be constrained for the video; determining that the value is no greater than 5; and in response to determining that the value is no greater than 5, extracting one or more bits from the bitstream, wherein a number of the one or more bits equals to the value, and decoding a remaining portion of the bitstream into images independent of the one or more bits.

16 Claims, 7 Drawing Sheets

Related U.S. Application Data filed on Jan. 10, 2022, provisional application No. 63/266,615, filed on Jan. 10, 2022.

(51) Int. Cl.
*H04N 19/184* (2014.01)
*H04N 19/46* (2014.01)
*H04N 19/70* (2014.01)

(58) Field of Classification Search
CPC .... H04N 19/463; H04N 19/136; H04N 19/36; H04N 19/107
See application file for complete search history.

(56) References Cited

U.S. PATENT DOCUMENTS

| | | | | |
|---|---|---|---|---|
| 11,924,474 | B2 | 3/2024 | Zhang et al. | |
| 11,924,475 | B2 * | 3/2024 | Deng | H04N 19/176 |
| 11,956,474 | B2 * | 4/2024 | Deng | H04N 19/102 |
| 11,991,395 | B2 | 5/2024 | Choi et al. | |
| 11,997,317 | B2 | 5/2024 | Choi et al. | |
| 12,167,042 | B2 | 12/2024 | Yu et al. | |
| 12,401,828 | B2 | 8/2025 | Choi et al. | |
| 2010/0091840 | A1 | 4/2010 | Gao et al. | |
| 2013/0301738 | A1 | 11/2013 | Kim et al. | |
| 2013/0315563 | A1 | 11/2013 | Kikuchi et al. | |
| 2014/0211841 | A1 | 7/2014 | Samuelsson et al. | |
| 2015/0264369 | A1 | 9/2015 | Ramasubramonian et al. | |
| 2017/0347128 | A1 | 11/2017 | Panusopone et al. | |
| 2020/0322610 | A1 | 10/2020 | Leleannec et al. | |
| 2021/0136369 | A1 | 5/2021 | Lim et al. | |
| 2021/0314587 | A1 * | 10/2021 | Choi | H04N 19/44 |
| 2021/0314623 | A1 | 10/2021 | Chang et al. | |
| 2021/0368209 | A1 | 11/2021 | Coban et al. | |
| 2021/0385452 | A1 | 12/2021 | Naser et al. | |
| 2022/0086497 | A1 * | 3/2022 | Wang | H04N 19/44 |
| 2022/0217352 | A1 | 7/2022 | Samuelsson et al. | |
| 2023/0026492 | A1 | 1/2023 | Ikai et al. | |
| 2023/0097659 | A1 | 3/2023 | Choi et al. | |
| 2023/0101542 | A1 | 3/2023 | Choi et al. | |
| 2023/0103067 | A1 * | 3/2023 | Hendry | H04N 19/70 375/240.02 |
| 2023/0122189 | A1 * | 4/2023 | Wang | H04N 19/70 375/240.26 |
| 2024/0236432 | A1 * | 7/2024 | Martin-Cocher | H04N 19/70 |
| 2024/0283979 | A1 | 8/2024 | Wang | |
| 2024/0305831 | A1 * | 9/2024 | Wang | H04N 19/70 |
| 2024/0373068 | A1 * | 11/2024 | Wang | H04N 19/70 |
| 2025/0056052 | A1 | 2/2025 | Yu et al. | |

FOREIGN PATENT DOCUMENTS

| | | | |
|---|---|---|---|
| CN | 108012155 | 5/2018 | |
| CN | 108055537 | 5/2018 | |
| CN | 109788285 | 5/2019 | |
| CN | 110430431 | 11/2019 | |
| EP | 4366303 | 5/2024 | |
| JP | 2016514911 | 5/2016 | |
| WO | 2020058567 | 3/2020 | |
| WO | 2021127723 | 7/2021 | |
| WO | 2021160165 | 8/2021 | |
| WO | 2021202178 | 10/2021 | |
| WO | 2021216736 | 10/2021 | |
| WO | 2021252396 | 12/2021 | |
| WO | 2022214877 | 10/2022 | |
| WO | 2023272533 | 1/2023 | |
| WO | WO-2023092019 A1 * | 5/2023 | H04N 19/91 |

OTHER PUBLICATIONS

WIPO, International Search Report and Written Opinion for International Application No. PCT/US2022/079487, Feb. 7, 2023.
Wenger, "H.264/AVC Over IP," IEEE Transactions on Circuits and Systems for Video Technology, Jul. 2003, vol. 13, No. 7.
WIPO, International Search Report and Written Opinion for International Application No. PCT/US2022/079490, Feb. 2, 2023.
WIPO, International Search Report and Written Opinion for International Application No. PCT/US2022/079494, Feb. 2, 2023.
Bross, "Versatile Video Coding Editorial Refinements on Draft 10," Joint Video Experts Team (JVET) of ITU-T SG 16 WP 3 and ISO/IEC JTC 1/SC 29, Document: JVET-T2001-v2, Oct. 2020.
Chang et al., "AhG9: On general constraint information syntax," Joint Video Experts Team (JVET) of ITU-T SG 16 WP 3 and ISO/IEC JTC 1/SC 29/WG 11, Document: JVET-R0286, Apr. 2020.
Sullivan et al., "Meeting Report of the 18th Meeting of the Joint Video Experts Team (JVET), by teleconference, Apr. 15-24, 2020," Joint Video Experts Team (JVET) of ITU-T SG 16 WP 3 and ISO/IEC JTC 1/SC 29/WG 11, Document: JVET-R2000-v1, Apr. 2020.
USPTO, Non-Final Rejection for U.S. Appl. No. 18/764,570, filed Aug. 27, 2024.
USPTO, Notice of Allowance for U.S. Appl. No. 18/753,216, filed Sep. 4, 2024.
EPO, Extended European Search Report for EP Application No. 22919229.9, Nov. 19, 2025.
USPTO, Non-Final Office Action for U.S. Appl. No. 18/963,989, filed Nov. 26, 2025.
IPA, Office Action for AU Application No. 2022308668, Apr. 4, 2025.
Tsukuba et al., "CE-related: High throughput mode for high bit-depth coding—harmonization of CE-3.2 and CE-1.1 -," Document: Joint Video Experts Team (JVET) of ITU-T SG 16 WP 3 and ISO/IEC JTC 1/SC 29, JVET-W0114-v2, Jul. 2021.
Wang et al., "CE-3 related: a slice level high throughput mode," Joint Video Experts Team (JVET) of ITU-T SG 16 WP 3 and ISO/IEC JTC 1/SC 29, Document: JVET-W0117-v1, Jul. 2021.
IPA, Office Action for AU Application No. 2022308668, Oct. 1, 2025.
Browne et al., "AHG8: On significance, GT1, and GT2 flag coding for high bit depths," Joint Video Experts Team (JVET) of ITU-T SG 16 WP 3 and ISO/IEC JTC 1/SC 29, Document: JVET-W0093-v2, Jul. 2021.
CNIPA, First Office Action for CN Application No. 202410509635.8, May 28, 2025.
CNIPA, Rejection Decision for CN Application No. 202410509635.8, Sep. 27, 2025.
EPO, Extended European Search Report for EP Application No. 22838402.0, Apr. 23, 2025.
Naser et al., "[AHG8] Sps Cleanup for VVC operation range extension," Joint Video Experts Team (JVET) of ITU-T SG 16 WP 3 and ISO/IEC JTC 1/SC 29, Document: JVET-W0070, Jul. 2021.
Wang et al., "CE-1.1: coding of last significant coefficient position for high bit depth and high bit rate extensions," Joint Video Experts Team (JVET) of ITU-T SG 16 WP 3 and ISO/IEC JTC 1/SC 29, Document: JVET-W0046, Jul. 2021.
Wang et al., "CE-3 related: a slice level high throughput mode," Joint Video Experts Team (JVET) of ITU-T SG 16 WP 3 and ISO/IEC JTC 1/SC 29, Document: JVET-W0117-v3, Jul. 2021.

(56) References Cited

OTHER PUBLICATIONS

Browne et al., "AHG8: On significance, GT1, and GT2 flag coding for high bit depths," Joint Video Experts Team (JVET) of ITU-T SG 16 WP 3 and ISO/IEC JTC 1/SC 29, Document: JVET-W0093-v1, Jul. 2021.
USPTO, Non-Final Office Action for U.S. Appl. No. 18/401,142, Mar. 6, 2024.
USPTO, Non-Final Office Action for U.S. Appl. No. 18/928,539, filed Oct. 29, 2025.
USPTO, Non-Final Office Action for U.S. Appl. No. 18/929,079, filed Nov. 25, 2025.
WIPO, International Search Report and Written Opinion for International Application No. PCT/US2022/036360, Oct. 6, 2022.
USPTO, Final Office Action U.S. Appl. No. 18/928,539, filed Feb. 10, 2026.
USPTO, Final Office Action U.S. Appl. No. 18/929,079, filed Feb. 10, 2026.
EPO, Communication for EP Application No. 22919229.9, Feb. 6, 2026.
Bossen et al., "VVC operation range extensions (Draft 3)," Joint Video Experts Team (JVET) of ITU-T SG 16 WP 3 and ISO/IEC JTC 1/SC 29, Document: JVET-V2005-v1, Apr. 2021.
JPO, Office Action for JP Application No. 2024-500653, Mar. 3, 2026.
IPOS, Office Action for SG Application No. 11202404523W, Apr. 12, 2026.
IPI, Office Action for IN Application No. 202417001735, May 4, 2026.
CNIPA, Second Office Action for CN Application No. 202410509635.8, May 20, 2026.
IPI, Office Action for IN Application No. 202417046188, Jun. 8, 2026.
IPI, Office Action for IN Application No. 202417050694, May 25, 2026.
FIPS, Office Action for RU Application No. 2025138481, Jun. 3, 2026.
FIPS, Office Action for RU Application No. 2025138482, Jun. 2, 2026.
FIPS, Office Action for RU Application No. 2025138483, Jun. 2, 2026.
CNIPA, First Office Action for CN Application No. 202511281805.2, Jun. 10, 2026.

* cited by examiner

SIGNALING GENERAL CONSTRAINTS INFORMATION IN METHOD FOR DECODING VIDEO, METHOD: FOR ENCODING VIDEO, AND NON-TRANSITORY COMPUTER-READABLE MEDIUM

CROSS-REFERENCE TO RELATED APPLICATIONS

This application is National Stage of International Application No. PCT/US2022/079487, filed Nov. 8, 2022, which claims priority to U.S. Provisional Application No. 63/266,615, filed on Jan. 10, 2022, U.S. Provisional Application No. 63/266,616, filed on Jan. 10, 2022, and U.S. Provisional Application No. 63/266,765, filed on Jan. 13, 2022, all of which are hereby incorporated in its entirety by this reference.

TECHNICAL FIELD

This disclosure relates generally to video processing. Specifically, the present disclosure involves a method for decoding a video, a non-transitory computer-readable medium, and a system.

BACKGROUND

The ubiquitous camera-enabled devices, such as smartphones, tablets, and computers, have made it easier than ever to capture videos or images. However, the amount of data for even a short video can be substantially large. Video coding technology (including video encoding and decoding) allows video data to be compressed into smaller sizes thereby allowing various videos to be stored and transmitted. Video coding has been used in a wide range of applications, such as digital TV broadcast, video transmission over the Internet and mobile networks, real-time applications (e.g., video chat, video conferencing), DVD and Blu-ray discs, and so on. To reduce the storage space for storing a video and/or the network bandwidth consumption for transmitting a video, it is desired to improve the efficiency of the video coding scheme.

SUMMARY

In one example, a method for decoding a video performed by a video decoder includes extracting a general constraints information (GCI) flag from a bitstream of the video; determining that one or more general constraints are imposed for the video based on a value of the GCI flag; in response to determining that one or more general constraints are imposed for the video, extracting, from the bitstream of the video, a value indicating a quantity of additional bits included in the bitstream of the video, the additional bits comprising flag bits indicating respective additional coding tools to be constrained for the video; determining that the value is no greater than 5; in response to determining that the value is no greater than 5, extracting one or more bits from the bitstream, wherein a number of the one or more bits equals to the value and decoding a remaining portion of the bitstream of the video into images independent of the one or more bits.

In another example, a non-transitory computer-readable medium has program code that is stored thereon and the program code is executable by one or more processing devices for performing operations. The operations include extracting a general constraints information (GCI) flag from a bitstream of the video; determining that one or more general constraints are imposed for the video based on a value of the GCI flag; in response to determining that one or more general constraints are imposed for the video, extracting, from the bitstream of the video, a value indicating a quantity of additional bits included in the bitstream of the video, the additional bits comprising flag bits indicating respective additional coding tools to be constrained for the video; determining that the value is no greater than 5; in response to determining that the value is no greater than 5, extracting one or more bits from the bitstream, wherein a number of the one or more bits equals to the value and decoding a remaining portion of the bitstream of the video into images independent of the one or more bits.

In yet another example, a system includes a processing device and a non-transitory computer-readable medium communicatively coupled to the processing device. The processing device is configured to execute program code stored in the non-transitory computer-readable medium and thereby perform operations. The operations include extracting a general constraints information (GCI) flag from a bitstream of the video; determining that one or more general constraints are imposed for the video based on a value of the GCI flag; in response to determining that one or more general constraints are imposed for the video, extracting, from the bitstream of the video, a value indicating a quantity of additional bits included in the bitstream of the video, the additional bits comprising flag bits indicating respective additional coding tools to be constrained for the video; determining that the value is no greater than 5; in response to determining that the value is no greater than 5, extracting one or more bits from the bitstream, wherein a number of the one or more bits equals to the value and decoding a remaining portion of the bitstream of the video into images independent of the one or more bits.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
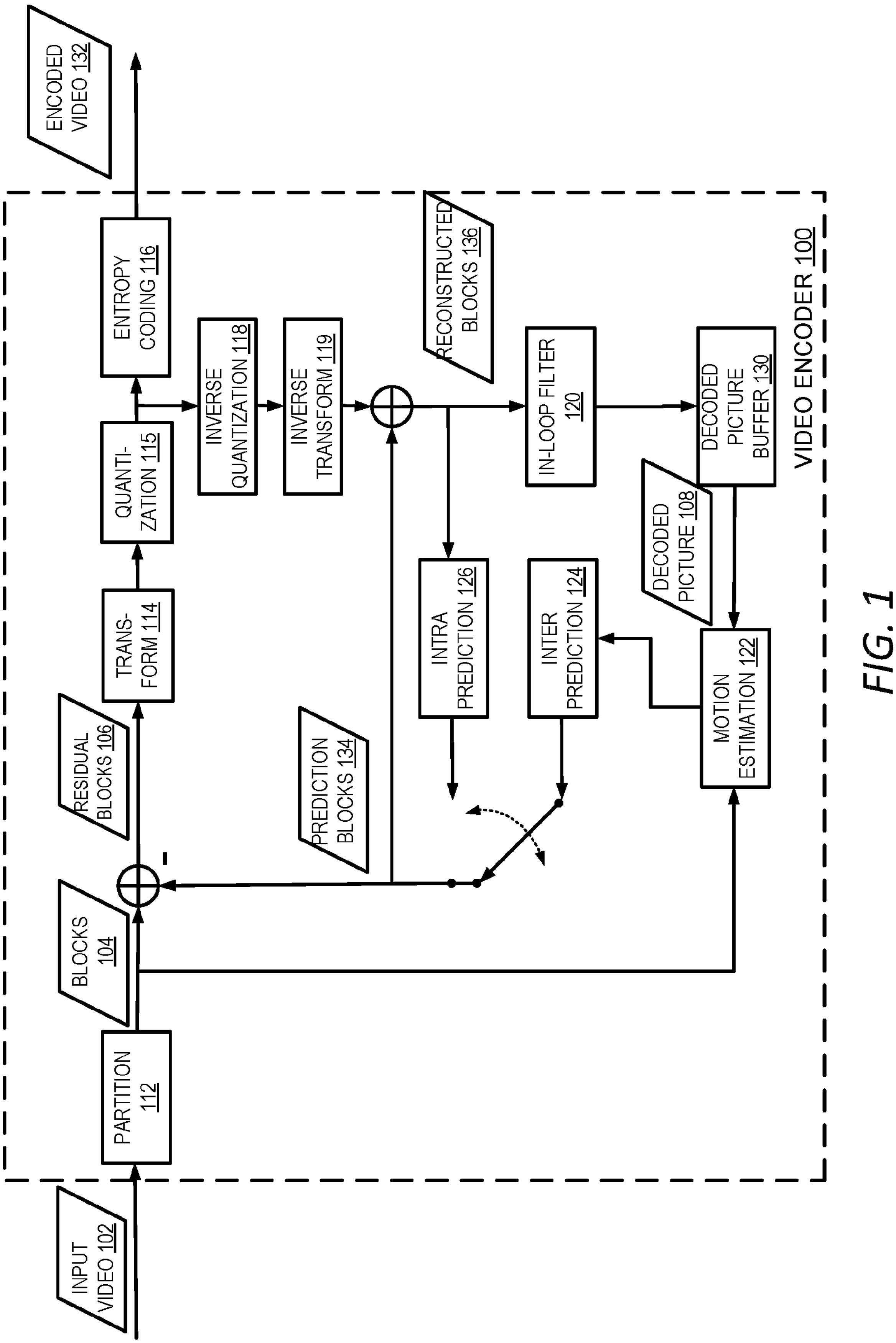
FIG. 1 is a block diagram showing an example of a video encoder configured to implement embodiments presented herein.

Various embodiments provide signaling and initialization for general constraints information for video coding. As discussed above, more and more video data are being generated, stored, and transmitted. It is beneficial to not only increase the efficiency of the video coding technology, but also to increase the stability of the video coding so that a video signal can be successfully decoded at the decoder side. Issues related to the stability of the video decoding include incompatibility and inconsistency issues. With the development of video coding technology, newer video coding standards are developed. One such video coding standard is version 1 of the Versatile Video Coding standard, which has been published jointly by the International Standards Organization (ISO) as "ISO/IEC 23090-3:2021 Information technology—Coded representation of immersive media Part 3: Versatile video coding" and by the International Telecommunication Union (ITU) as "Recommendation ITU-T H.266 (08/2020): Versatile Video Coding". In this disclosure, version 1 of the Versatile Video Coding standard may be referred to as "VVC version 1" or "VVCv1". VVC version 1 has been superseded by version 2 of the Versatile Video Coding standard, which will be published jointly by the ISO as "ISO/IEC 23090-3:2022 Information technology—Coded representation of immersive media Part 3: Versatile video coding" and by the ITU as "Recommendation ITU-T H.266 (04/2022): Versatile Video Coding". In this disclosure, version 2 of the Versatile Video Coding standard may be referred to as "VVC version 2" or "VVCv2". To allow a video signal encoded with previous versions of the video coding standard to be successfully decoded by a video decoder following a new version of the video coding standard, the video coding scheme should be designed to be backward compatible with the previous versions of coding standards. However, the signaling of the general constraints information used in the current draft of VVC version 2 causes desynchronization in video decoding which is a serious incompatibility problem between different versions of a video coding standard. Furthermore, in the current draft of VVC version 2, general constraint flags related to the general constraints information may be undefined in some cases leading to ambiguity and inconsistency in the decoder implementations. Various embodiments described herein address these problems by introducing signaling and initialization methods for general constraints information for video coding thereby improving the stability of the video coding.

In the VVC standard, a general constraints information (GCI) syntax structure, general_constraints_info( ), is used to indicate specific constraint properties of the bitstream. The GCI contains a list of constraint flags and non-flag syntax elements. A binary flag gci_present_flag is used to specify if GCI syntax elements are present or not. In some embodiments, if a VVC version 2 bitstream signals general constraint information (i.e., gci_present_flag has a value of 1), and the VVC version 2 general constraints information consists of N additional coding tools that may be constrained, then a syntax element gci_num_additional_bits corresponding to the N additional coding tools may be set only to the value of 0 or N. If gci_num_additional_bits is set to 0, then general constraint flags for the N additional coding tools are not signaled. If gci_num_additional_bits is set to N, then the next N bits in the bitstream are used to signal the general constraint flags for the N additional coding tools. In one example, N is set to 6.

In some examples, setting gci_num_additional_bits to a value other than 0 or N is not permitted for a VVC version 2 bitstream. However, a VVC version 2 decoder may still handle the general constraints information which sets gci_num_additional_bits to a value other than 0 or N. For example, the gci_num_additional_bits can be set to a value M that is greater than 0 and less than N or a value greater than N. If M is greater than 0 and less than N, after decoding the gci_num_additional_bits syntax element, the decoder extracts M bits from the bitstream and discards them. If M is greater than N, after decoding the gci_num_additional_bits syntax element, the decoder extracts N bits from the bitstream and interprets them as the general constraint flags for the N additional coding tools. Then the decoder extracts further (M-N) bits from the bitstream and discards them. In other examples, the VVC version 2 decoder is not required to handle the general constraints information which sets gci_num_additional_bits to a value greater than 0 but less than N. Legal VVC version 2 bitstreams may only set gci_num_reserved_bits to the value 0 or N. Bitstreams for future versions of VVC will not be allowed to set gci_num_additional_bits to a value between 0 and N.

In some embodiments, initializing the general constraint information flags is used to address the ambiguity and inconsistency problems of decoder implementations discussed above. In these embodiments, when gci_present_flag is equal to 1 and gci_num_additional_bits is equal to 0, general_constraints_info( ) does not impose constraints on the coding tools related to the general constraint information flags. In examples where a flag value of 0 indicates no constraints, the value of a general constraint information flag is inferred to be equal to 0 when the flag is not present.

The embodiments described in this disclosure provide methods by which the general constraint flags for additional coding tools in VVC version 2 may be signaled and inferred. Unlike the prior art, high level syntax bitstreams produced by the methods described in this disclosure are compatible with VVC version 1 decoders and may be decoded without a desynchronization between the behaviour of VVC version 1 decoders and VVC version 2 decoders. The inference rules described in this disclosure remove ambiguity for VVC version 2 decoding behaviour of the VVC version 2 GCI syntax elements. These techniques can be effective coding tools in various video coding standards.

Referring now to the drawings, FIG. 1 is a block diagram showing an example of a video encoder 100 configured to implement embodiments presented herein. In the example shown in FIG. 1, the video encoder 100 includes a partition module 112, a transform module 114, a quantization module 115, an inverse quantization module 118, an inverse transform module 119, an in-loop filter module 120, an intra prediction module 126, an inter prediction module 124, a motion estimation module 122, a decoded picture buffer 130, and an entropy coding module 116.

The input to the video encoder 100 is an input video 102 containing a sequence of pictures (also referred to as frames or images). In a block-based video encoder, for each of the pictures, the video encoder 100 employs a partition module 112 to partition the picture into blocks 104, and each block contains multiple pixels. The blocks may be macroblocks, coding tree units, coding units, prediction units, and/or prediction blocks. One picture may include blocks of different sizes and the block partitions of different pictures of the video may also differ. Each block may be encoded using different predictions, such as intra prediction or inter prediction or intra and inter hybrid prediction.

Usually, the first picture of a video signal is an intra-coded picture, which is encoded using only intra prediction. In the intra prediction mode, a block of a picture is predicted using only data that has been encoded from the same picture. A picture that is intra-coded can be decoded without information from other pictures. To perform the intra-prediction, the video encoder 100 shown in FIG. 1 can employ the intra prediction module 126. The intra prediction module 126 is configured to use reconstructed samples in reconstructed blocks 136 of neighboring blocks of the same picture to generate an intra-prediction block (the prediction block 134). The intra prediction is performed according to an intra-prediction mode selected for the block. The video encoder 100 then calculates the difference between block 104 and the intra-prediction block 134. This difference is referred to as residual block 106.

To further remove the redundancy from the block, the residual block 106 is transformed by the transform module 114 into a transform domain by applying a transform on the samples in the block. Examples of the transform may include, but are not limited to, a discrete cosine transform (DCT) or discrete sine transform (DST). The transformed values may be referred to as transform coefficients representing the residual block in the transform domain. In some examples, the residual block may be quantized directly without being transformed by the transform module 114. This is referred to as a transform skip mode.

The video encoder 100 can further use the quantization module 115 to quantize the transform coefficients to obtain quantized coefficients. Quantization includes dividing a sample by a quantization step size followed by subsequent rounding, whereas inverse quantization involves multiplying the quantized value by the quantization step size. Such a quantization process is referred to as scalar quantization. Quantization is used to reduce the dynamic range of video samples (transformed or non-transformed) so that fewer bits are used to represent the video samples.

The quantization of coefficients/samples within a block can be done independently and this kind of quantization method is used in some existing video compression standards, such as H.264, and HEVC. For an N-by-M block, some scan order may be used to convert the 2D coefficients of a block into a 1-D array for coefficient quantization and coding. Quantization of a coefficient within a block may make use of the scan order information. For example, the quantization of a given coefficient in the block may depend on the status of the previous quantized value along the scan order. In order to further improve the coding efficiency, more than one quantizer may be used. Which quantizer is used for quantizing a current coefficient depends on the information preceding the current coefficient in the encoding/decoding scan order. Such a quantization approach is referred to as dependent quantization.

The degree of quantization may be adjusted using the quantization step sizes. For instance, for scalar quantization, different quantization step sizes may be applied to achieve finer or coarser quantization. Smaller quantization step sizes correspond to finer quantization, whereas larger quantization step sizes correspond to coarser quantization. The quantization step size can be indicated by a quantization parameter (QP). Quantization parameters are provided in an encoded bitstream of the video such that the video decoder can access and apply the quantization parameters for decoding.

The quantized samples are then coded by the entropy coding module 116 to further reduce the size of the video signal. The entropy encoding module 116 is configured to apply an entropy encoding algorithm to the quantized samples. In some examples, the quantized samples are binarized into binary bins and coding algorithms further compress the binary bins into bits. Examples of the binarization methods include, but are not limited to, a combined truncated Rice (TR) and limited k-th order Exp-Golomb (EGk) binarization, and k-th order Exp-Golomb binarization. Examples of the entropy encoding algorithm include, but are not limited to, a variable length coding (VLC) scheme, a context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding, or other entropy encoding techniques. The entropy-coded data is added to the bitstream of the output encoded video 132.

As discussed above, reconstructed blocks 136 from neighboring blocks are used in the intra-prediction of blocks of a picture. Generating the reconstructed block 136 of a block involves calculating the reconstructed residuals of this block. The reconstructed residual can be determined by applying inverse quantization and inverse transform to the quantized residual of the block. The inverse quantization module 118 is configured to apply the inverse quantization to the quantized samples to obtain de-quantized coefficients. The inverse quantization module 118 applies the inverse of the quantization scheme applied by the quantization module 115 by using the same quantization step size as the quantization module 115. The inverse transform module 119 is configured to apply the inverse transform of the transform applied by the transform module 114 to the de-quantized samples, such as inverse DCT or inverse DST. The output of the inverse transform module 119 is the reconstructed residuals for the block in the pixel domain. The reconstructed residuals can be added to the prediction block 134 of the block to obtain a reconstructed block 136 in the pixel domain. For blocks where the transform is skipped, the inverse transform module 119 is not applied to those blocks. The de-quantized samples are the reconstructed residuals for the blocks.

Blocks in subsequent pictures following the first intra-predicted picture can be coded using either inter prediction or intra prediction. In inter-prediction, the prediction of a block in a picture is from one or more previously encoded video pictures. To perform inter prediction, the video encoder 100 uses an inter prediction module 124. The inter prediction module 124 is configured to perform motion compensation for a block based on the motion estimation provided by the motion estimation module 122.

The motion estimation module 122 compares a current block 104 of the current picture with decoded reference pictures 108 for motion estimation. The decoded reference pictures 108 are stored in a decoded picture buffer 130. The motion estimation module 122 selects a reference block from the decoded reference pictures 108 that best matches the current block. The motion estimation module 122 further identifies an offset between the position (e.g., x, y coordinates) of the reference block and the position of the current block. This offset is referred to as the motion vector (MV) and is provided to the inter prediction module 124 along with the selected reference block. In some cases, multiple reference blocks are identified for the current block in multiple decoded reference pictures 108. Therefore, multiple motion vectors are generated and provided to the inter prediction module 124 along with the corresponding reference blocks.

The inter prediction module 124 uses the motion vector(s) along with other inter-prediction parameters to perform motion compensation to generate a prediction of the current block, i.e., the inter prediction block 134. For example, based on the motion vector(s), the inter prediction module 124 can locate the prediction block(s) pointed to by the motion vector(s) in the corresponding reference picture(s). If there is more than one prediction block, these prediction blocks are combined with some weights to generate a prediction block 134 for the current block.

For inter-predicted blocks, the video encoder 100 can subtract the inter-prediction block 134 from block 104 to generate the residual block 106. The residual block 106 can be transformed, quantized, and entropy coded in the same way as the residuals of an intra-predicted block discussed above. Likewise, the reconstructed block 136 of an inter-predicted block can be obtained through inverse quantizing, inverse transforming the residual, and subsequently combining with the corresponding prediction block 134.

To obtain the decoded picture 108 used for motion estimation, the reconstructed block 136 is processed by an in-loop filter module 120. The in-loop filter module 120 is configured to smooth out pixel transitions thereby improving the video quality. The in-loop filter module 120 may be configured to implement one or more in-loop filters, such as a de-blocking filter, a sample-adaptive offset (SAO) filter, an adaptive loop filter (ALF), etc.

Figure 2:
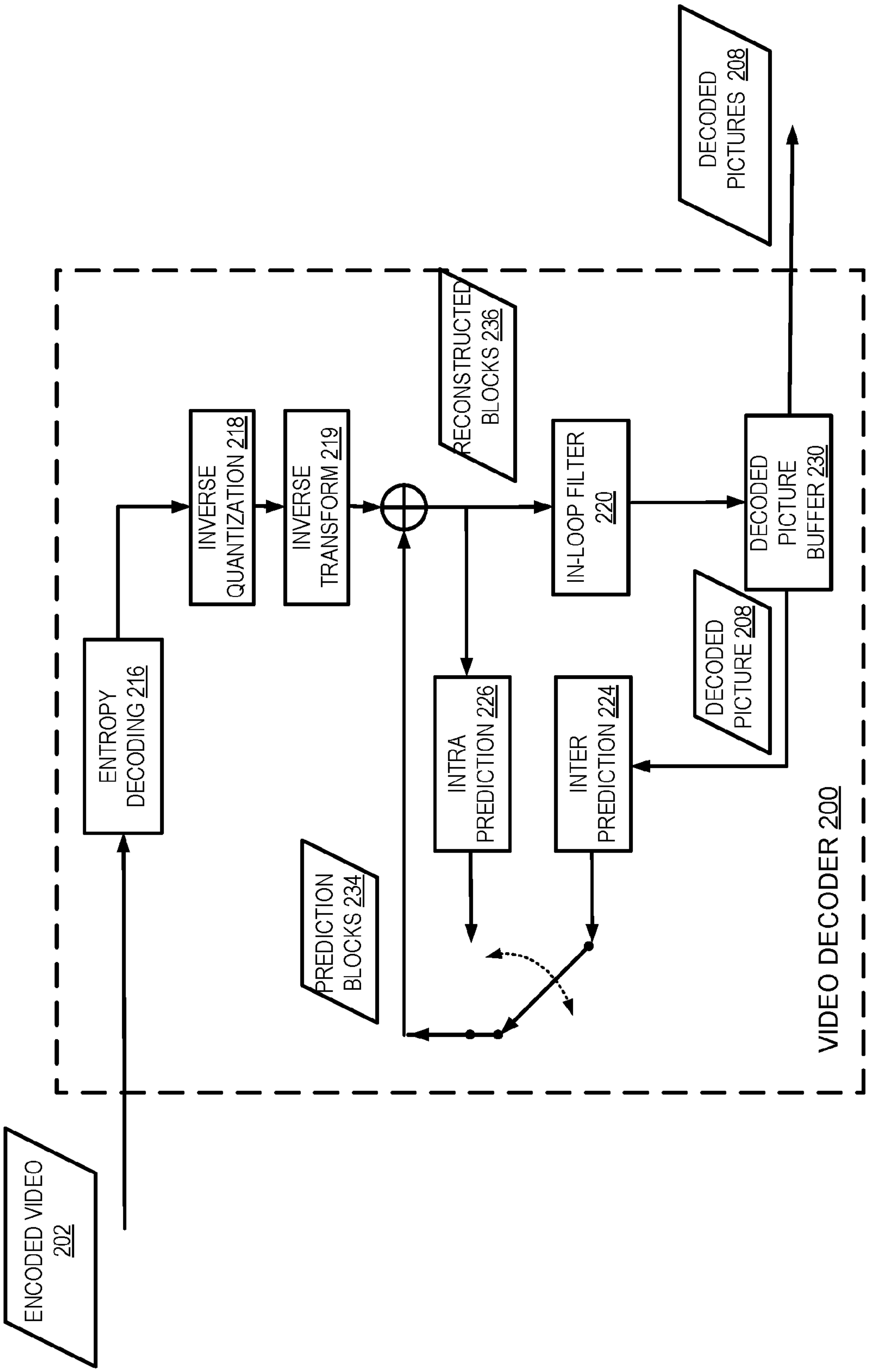
FIG. 2 is a block diagram showing an example of a video decoder configured to implement embodiments presented herein.

FIG. 2 depicts an example of a video decoder 200 configured to implement the embodiments presented herein. The video decoder 200 processes an encoded video 202 in a bitstream and generates decoded pictures 208. In the example shown in FIG. 2, the video decoder 200 includes an entropy decoding module 216, an inverse quantization module 218, an inverse transform module 219, an in-loop filter module 220, an intra prediction module 226, an inter prediction module 224, and a decoded picture buffer 230.

The entropy decoding module 216 is configured to perform entropy decoding of the encoded video 202. The entropy decoding module 216 decodes the quantized coefficients, coding parameters including intra prediction parameters and inter prediction parameters, and other information. In some examples, the entropy decoding module 216 decodes the bitstream of the encoded video 202 to binary representations and then converts the binary representations to quantization levels of the coefficients. The entropy-decoded coefficient levels are then inverse quantized by the inverse quantization module 218 and subsequently inverse transformed by the inverse transform module 219 to the pixel domain. The inverse quantization module 218 and the inverse transform module 219 function similarly to the inverse quantization module 118 and the inverse transform module 119, respectively, as described above with respect to FIG. 1. The inverse-transformed residual block can be added to the corresponding prediction block 234 to generate a reconstructed block 236. For blocks where the transform is skipped, the inverse transform module 219 is not applied to those blocks. The de-quantized samples generated by the inverse quantization module 118 are used to generate the reconstructed block 236.

The prediction block 234 of a particular block is generated based on the prediction mode of the block. If the coding parameters of the block indicate that the block is intra predicted, the reconstructed block 236 of a reference block in the same picture can be fed into the intra prediction module 226 to generate the prediction block 234 for the block. If the coding parameters of the block indicate that the block is inter-predicted, the prediction block 234 is generated by the inter prediction module 224. The intra prediction module 226 and the inter prediction module 224 function similarly to the intra prediction module 126 and the inter prediction module 124 of FIG. 1, respectively.

As discussed above with respect to FIG. 1, the inter prediction involves one or more reference pictures. The video decoder 200 generates the decoded pictures 208 for the reference pictures by applying the in-loop filter module 220 to the reconstructed blocks of the reference pictures. The decoded pictures 208 are stored in the decoded picture buffer 230 for use by the inter prediction module 224 and also for output.

Figure 3:
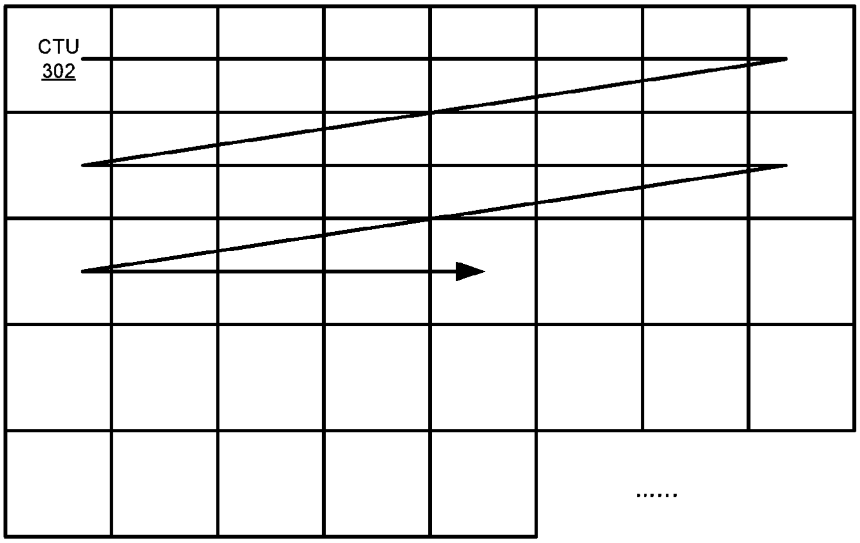
FIG. 3 depicts an example of a coding tree unit division of a picture in a video, according to some embodiments of the present disclosure.
Figure 4:
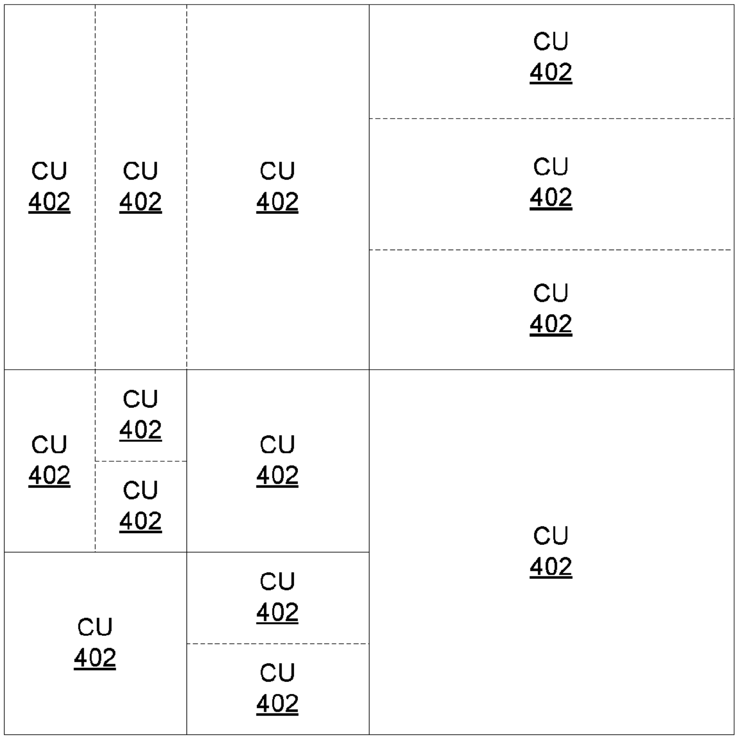
FIG. 4 depicts an example of a coding unit division of a coding tree unit, according to some embodiments of the present disclosure.

Referring now to FIG. 3, FIG. 3 depicts an example of a coding tree unit division of a picture in a video, according to some embodiments of the present disclosure. As discussed above with respect to FIGS. 1 and 2, to encode a picture of a video, the picture is divided into blocks, such as the CTUs (Coding Tree Units) 302 in VVC, as shown in FIG. 3. For example, the CTUs 302 can be blocks of 128×128 pixels. The CTUs are processed according to an order, such as the order shown in FIG. 3. In some examples, each CTU 302 in a picture can be partitioned into one or more CUs (Coding Units) 402 as shown in FIG. 4, which can be further partitioned into prediction units or transform units (TUs) for prediction and transformation. Depending on the coding schemes, a CTU 302 may be partitioned into CUs 402 differently. For example, in VVC, the CUs 402 can be rectangular or square, and can be coded without further partitioning into prediction units or transform units. Each CU 402 can be as large as its root CTU 302 or be subdivisions of a root CTU 302 as small as 4×4 blocks. As shown in FIG. 4, a division of a CTU 302 into CUs 402 in VVC can be quadtree splitting or binary tree splitting or ternary tree splitting. In FIG. 4, solid lines indicate quadtree splitting and dashed lines indicate binary or ternary tree splitting.

General Constraints Information in VVC Version 1 (VVCv1)

In VVC version 1, a general constraints information (GCI) syntax structure, general_constraints_info( ), is used to indicate specific constraint properties of the bitstream. The GCI contains a list of constraint flags and non-flag syntax elements. A binary flag gci_present_flag is used to specify if GCI syntax elements are present or not. gci_present_flag equal to 1 specifies that GCI syntax elements are present in the general_constraints_info( ) syntax structure. gci_present_flag equal to 0 specifies that GCI fields are not present in the general_constraints_info( ) syntax structure and the general_constraint_info( ) syntax structure does not impose any constraint.

General constraint information may be signaled in high level syntax in a number of contexts. For example, GCI may be signaled in a network packet that only contains decoding capability information, such as a network abstract layer (NAL) packet with nal_unit_type set to 13 (i.e., DCI_NUT as the name of nal_unit_type) carrying decoding capability information only. Alternatively, GCI may be signaled in a video parameter set, or in a sequence parameter set.

The purpose of the GCI syntax structure is to enable the discovery of configuration information about the features needed for decoding the bitstream and to allow the signaling of interoperability points which impose restrictions beyond those specified by the profile, tier and level (PTL), with a finer granularity than allowed by previous video coding standards. Similar to sub-profiles, the use of the GCI syntax structure could allow interoperability to be defined for decoder implementations that do not support all features of a VVC profile but address the needs of particular applications. Decoder implementations may examine the GCI syntax elements to check if a bitstream avoids the use of particular features, in order to determine how to configure the decoding process, and identify whether the bitstream is decodable by the decoder. Decoder implementations that support all features of a VVC profile can ignore the GCI syntax element values, as such decoders will be capable of decoding any bitstream conforming to the indicated PTL.

The general constraints information syntax structure as specified in VVC version 1 is defined below:

| | Descriptor |
|---|---|
| general_constraints_info( ) { | |
| **gci_present_flag** | u(1) |
| if( gci_present_flag ) { | |
| /* general */ | |
| **gci_intra_only_constraint_flag** | u(1) |
| **gci_all_layers_independent_constraint_flag** | u(1) |
| **gci_one_au_only_constraint_flag** | u(1) |
| /* picture format */ | |
| **gci_sixteen_minus_max_bitdepth_constraint_idc** | u(4) |
| **gci_three_minus_max_chroma_format_constraint_idc** | u(2) |
| /* NAL unit type related */ | |
| **gci_no_mixed_nalu_types_in_pic_constraint_flag** | u(1) |
| **gci_no_trail_constraint_flag** | u(1) |
| **gci_no_stsa_constraint_flag** | u(1) |
| **gci_no_rasl_constraint_flag** | u(1) |
| **gci_no_radl_constraint_flag** | u(1) |
| **gci_no_idr_constraint_flag** | u(1) |
| **gci_no_cra_constraint_flag** | u(1) |
| **gci_no_gdr_constraint_flag** | u(1) |
| **gci_no_aps_constraint_flag** | u(1) |
| **gci_no_idr_rpl_constraint_flag** | u(1) |
| /* tile, slice, subpicture partitioning */ | |
| **gci_one_tile_per_pic_constraint_flag** | u(1) |
| **gci_pic_header_in_slice_header_constraint_flag** | u(1) |
| **gci_one_slice_per_pic_constraint_flag** | u(1) |
| **gci_no_rectangular_slice_constraint_flag** | u(1) |
| **gci_one_slice_per_subpic_constraint_flag** | u(1) |
| **gci_no_subpic_info_constraint_flag** | u(1) |
| /* CTU and block partitioning */ | |
| **gci_three_minus_max_log2_ctu_size_constraint_idc** | u(2) |
| **gci_no_partition_constraints_override_constraint_flag** | u(1) |
| **gci_no_mtt_constraint_flag** | u(1) |
| **gci_no_qtbtt_dual_tree_intra_constraint_flag** | u(1) |
| /* intra */ | |
| **gci_no_palette_constraint_flag** | u(1) |
| **gci_no_ibc_constraint_flag** | u(1) |
| **gci_no_isp_constraint_flag** | u(1) |
| **gci_no_mrl_constraint_flag** | u(1) |
| **gci_no_mip_constraint_flag** | u(1) |
| **gci_no_cclm_constraint_flag** | u(1) |
| /* inter */ | |
| **gci_no_ref_pic_resampling_constraint_flag** | u(1) |
| **gci_no_res_change_in_clvs_constraint_flag** | u(1) |
| **gci_no_weighted_prediction_constraint_flag** | u(1) |
| **gci_no_ref_wraparound_constraint_flag** | u(1) |
| **gci_no_temporal_mvp_constraint_flag** | u(1) |
| **gci_no_sbtmvp_constraint_flag** | u(1) |
| **gci_no_amvr_constraint_flag** | u(1) |
| **gci_no_bdof_constraint_flag** | u(1) |
| **gci_no_smvd_constraint_flag** | u(1) |
| **gci_no_dmvr_constraint_flag** | u(1) |
| **gci_no_mmvd_constraint_flag** | u(1) |
| **gci_no_affine_motion_constraint_flag** | u(1) |
| **gci_no_prof_constraint_flag** | u(1) |
| **gci_no_bcw_constraint_flag** | u(1) |
| **gci_no_ciip_constraint_flag** | u(1) |
| **gci_no_gpm_constraint_flag** | u(1) |
| /* transform, quantization, residual */ | |
| **gci_no_luma_transform_size_64_constraint_flag** | u(1) |
| **gci_no_transform_skip_constraint_flag** | u(1) |
| **gci_no_bdpcm_constraint_flag** | u(1) |
| **gci_no_mts_constraint_flag** | u(1) |
| **gci_no_lfnst_constraint_flag** | u(1) |
| **gci_no_joint_cbcr_constraint_flag** | u(1) |
| **gci_no_sbt_constraint_flag** | u(1) |
| **gci_no_act_constraint_flag** | u(1) |
| **gci_no_explicit_scaling_list_constraint_flag** | u(1) |
| **gci_no_dep_quant_constraint_flag** | u(1) |
| **gci_no_sign_data_hiding_constraint_flag** | u(1) |
| **gci_no_cu_qp_delta_constraint_flag** | u(1) |
| **gci_no_chroma_qp_offset_constraint_flag** | u(1) |
| /* loop filter */ | |
| **gci_no_sao_constraint_flag** | u(1) |

-continued

| | Descriptor |
|---|---|
| **gci_no_alf_constraint_flag** | u(1) |
| **gci_no_ccalf_constraint_flag** | u(1) |
| **gci_no_lmcs_constraint_flag** | u(1) |
| **gci_no_ladf_constraint_flag** | u(1) |
| **gci_no_virtual_boundaries_constraint_flag** | u(1) |
| **gci_num_reserved_bits** | u(8) |
| for( i = 0; i < gci_num_reserved_bits; i++ ) | |
| **gci_reserved_zero_bit**[ i ] | u(1) |
| } | |
| while( !byte_aligned( ) ) | |
| **gci_alignment_zero_bit** | f(1) |
| } | |

The presence of general constraint flags is dependent on the value of gci_present_flag. When gci_present_flag has a value of 1, general constraint flags are present in the bitstream. When gci_present_flag has a value of 0, general constraint flags are not present in the bitstream.

Beyond the general constraint flags defined by VVCv1, provision for additional general constraint flags is enabled by the syntax element gci_num_reserved_bits. gci_num_reserved_bits is an 8 bit unsigned integer whose value indicates the number of additional bits which are signaled in the general constraints syntax structure. In the VVC specifications, these additional bits, referred to as the syntax elements gci_reserved_zero_bit[i], are extracted from the bitstream and discarded. Such provision allows VVCv1 decoders to be forward compatible at least with the high level syntax portion of bitstreams produced by later versions of VVC.

General Constraints Information in VC version 2 (VVCv2)

In the current draft of VVC version 2 ("VVC operation range extensions (Draft 5)", Document of Joint Video Experts Team of ITU-T SG 16 WP 3 and ISO/IEC JTC 1/SC 29, JVET-X2005), a number of additional coding tools are proposed to be constrained by general constraint flags. The 8-bit field which is referred to as gc_num_reserved_bits in VVCv1 is proposed to be renamed to gci_num_additional_bits. The proposed adjusted syntax for VVCv2 is as below:

| | Descriptor |
|---|---|
| general_constraints_info( ) { | |
| **gci_present_flag** | u(1) |
| if( gci_present_flag ) { | |
| /* general */ | |
| **gci_intra_only_constraint_flag** | u(1) |
| **...** | |
| ~~**gci_num_reserved_bits**~~ | ~~u(8)~~ |
| **gci_num_additional_bits** | u(8) |
| if( gci_num_additional_bits > 0 ) { | |
| **gci_all_rap_pictures_constraint_flag** | u(1) |
| **gci_no_extended_precision_processing_constraint_flag** | u(1) |
| **gci_no_ts_residual_coding_rice_constraint_flag** | u(1) |
| **gci_no_rrc_rice_extension_constraint_flag** | u(1) |
| **gci_no_persistent_rice_adaptation_constraint_flag** | u(1) |
| **gci_no_reverse_last_sig_coeff_constraint_flag** | u(1) |
| numAdditionalBitsUsed = 6 | |
| } else | |
| numAdditionalBitsUsed = 0 | |
| for( i = 0; i < gci_num_additional_bits − numAdditionalBitsUsed; i++ ) | |
| ~~for( i = 0; i < gci_num_reserved_bits; i++ )~~ | |
| **gci_reserved_zero_bit**[ i ] | u(1) |
| } | |
| while( !byte_aligned( ) ) | |
| **gci_alignment_zero_bit** | f(1) |
| } | |

In total there are 6 additional general constraint flags: gci_all_rap_pictures_constraint_flag, gci_no_extended_precision_processing_constraint_flag, gci_no_ts_residual_coding_rice_constraint_flag, gci_no_rrc_rice_extension_constraint_flag, gci_no_persistent_rice_adaptation_constraint_flag, and gci_no_reverse_last_sig_coeff_constraint_flag. The proposed interpretation ("semantics") of the gci_num_additional_bits syntax element is below:

gci_num_additional_bits specifies the number of the additional GCI bits in the general constraints information syntax structure other than gci_alignment_zero_bit syntax elements (when present). The value of gci_num_additional_bits shall be equal to 0 or 1 in bitstreams conforming to this version of this document. Values greater than 1 for gci_num_additional_bits are reserved for future use by ITU-T|ISO/IEC. Although the value of gci_num_additional_bits is required to be equal to 0 or 1 in this version of this document, decoders conforming to this version of this document shall allow values of gci_num_additional_bits greater than 1 to appear in the syntax and shall ignore the values of all the gci_reserved_zero_bit[i] syntax elements when gci_num_additional_bits is greater than 1.

It was proposed that if a VVCv2 bitstream signals general constraint information, the syntax element gci_num_additional_bits should be set to 0 if the 6 VVCv2 general constraint flags are not signaled, while gci_num_additional_bits should be set to 1 if the 6 VVCv2 general constraint flags are signaled.

However, the above proposed VVCv2 specification for general constraints syntax causes incompatibility with VVCv1 decoders. Specifically, when the additional general constraints flags are signaled, the proposed VVCv2 syntax signals this by setting gci_num_additional_bits to 1. In a VVCv2 decoder, when general constraints information is signaled, the gci_num_additional_bits syntax element is decoded from the bitstream as an 8-bit unsigned integer. If gci_num_additional_bits is decoded as the value 1, 6 additional bits will be decoded from the bitstream. These 6 bits are interpreted as the general constraint flags for the additional decoding tools that may be constrained in VVCv2.

In a VVCv1 decoder, the same 8-bit field is interpreted as gci_num_reserved_bits. If this syntax element is decoded as the value 1, however, only 1 additional bit will be decoded from the bitstream. This bit is discarded and not used. Consequently, a VVCv1 decoder which is decoding a VVCv2 bitstream may encounter the desynchronization problem due to the presence of 5 additional bits in the bitstream which are not recognized by the VVCv1 specification.

As discussed above, desynchronization is a serious incompatibility problem between different versions of a video coding standard. A VVCv1 decoder may not be able to decode the entirety of a VVCv2 bitstream because the VVCv2 bitstream may exercise coding tools which are defined in the VVCv2 specification but are not known to VVCv1 decoders. However, it is desirable that a VVCv1 decoder should at least be able to decode the high level syntax portion of a VVCv2 bitstream. By decoding the high level syntax successfully, the video decoder may determine not just general constraint information, but also profile and tier information. Such information provides hints to the decoder of the capabilities required to decode the bitstream. For example, general constraint information provides indications to the decoder as to which coding tools are constrained by the bitstream. Profile and tier information provides indications to the decoder about the uncompressed video data throughput (e.g., the video data rate, the framerate, the resolution, etc.) that needs to be supported.

If the high level syntax is successfully decoded, the video decoder can determine whether the current bitstream can be decoded, and if not, the decoder can gracefully terminate the decoding process. In contrast, desynchronization during decoding of the high level syntax means that the information provided in the high level syntax may not be decoded correctly. In the worst case, the decoder may decode entirely incorrect values for syntax elements following the desynchronization event, which may then lead to incorrect parameter settings, and incorrect decoding of subsequent low level syntax causing a decoding failure.

Furthermore, in a VVCv2 decoder, when general constraints information is signaled, the gci_num_additional_bits syntax element is decoded from the bitstream as an 8-bit unsigned integer. If gci_num_additional_bits is decoded as the value 0, no further general constraint flags are signaled. In such case, no inferred values are specified for the additional general constraint flags and their values are undefined. Therefore, the behavior of whether the coding tools related to the additional general constraint flags should be constrained or unconstrained is ambiguous, which may lead to inconsistent decoder implementations.

In the VVC specification, the name of the syntax element gci_reserved_zero_bit[i] suggests misleadingly that such syntax elements must have the value of 0. Generally, a default value is embedded in the name of a reserved syntax element when it will be written to the bitstream by the encoder as a placeholder. However, the design of the general constraints syntax structure means that gci_reserved_zero_bit[i] is never written by an encoder. gci_reserved_zero_bit[i] is only exercised when a VVC decoder of a particular version reads a VVC bitstream of a higher version. In such a case gci_reserved_zero_bit[i] cannot be guaranteed to have the value 0. In the following, a number of solutions are proposed to solve the problems described above.

Signaling General Constraint Information

In one embodiment of signaling the general constraint information to address the desynchronization problem discussed above, if a VVCv2 bitstream signals general constraint information (i.e., gci_present_flag has a value of 1), and the VVCv2 general constraint information consists of N additional coding tools that may be constrained, then the syntax element gci_num_additional_bits may be set only to the value 0 or N. If gci_num_additional_bits is set to 0, then general constraint flags for the N additional coding tools are not signaled. If gci_num_additional_bits is set to N, then the next N bits in the bitstream are used to signal the general constraint flags for the N additional coding tools. In one example, N is set as 6.

Setting gci_num_additional_bits to a value other than 0 or N is not permitted for a VVCv2 bitstream. However, a VVCv2 decoder may still handle general constraint information which sets gci_num_additional_bits to a value other than 0 or N. For example, the gci_num_additional_bits can be set to a value greater than 0 and less than N or a value greater than N. Let the decoded value for gci_num_additional_bits be M. Then, if M is greater than 0 but less than N (i.e., $0<M<N$), after decoding the gci_num_additional_bits syntax element, the decoder extracts M bits from the bitstream as gci_reserved_zero_bit[i] syntax elements and discards them. If M is greater than N ($N<M$), after decoding the gci_num_additional_bits syntax element, the decoder extracts N bits from the bitstream and interprets them as general constraint flags for the N additional coding tools.

Then the decoder extracts further (M-N) bits from the bitstream as gci_reserved_zero_bit[i] syntax elements and discards them.

In other examples, the VVCv2 decoder is not required to handle general constraint information which sets gci_num_additional_bits to a value greater than 0 but less than N. Legal VVCv1 bitstreams may only set gci_num_reserved_bits to the value 0. Legal VVCv2 bitstreams may only set gci_num_additional_bits to the value 0 or N. Bitstreams for future versions of VVC will not be allowed to set gci_num_additional_bits to a value between 0 and N.

In one example of this embodiment, the modification to the general constraint information syntax for VVCv2 with the 6 general constraint flags currently proposed for VVCv2 coding tools is shown in Table 1 below (additions are underlined and deletions are shown in strikethrough), where "if(gci_num_additional_bits>0)" is replaced with "if (gci_num_additional_bits>5)."

TABLE 1

| | Descriptor |
|---|---|
| general_constraints_info( ) { | |
| **gci_present_flag** | u(1) |
| if( gci_present_flag ) { | |
| /* general */ | |
| **gci_intra_only_constraint_flag** | u(1) |
| ... | |
| **gci_num_additional_bits** | u(8) |
| if( gci_num_additional_bits > ~~0~~ 5 ) { | |
| **gci_all_rap_pictures_constraint_flag** | u(1) |
| **gci_no_extended_precision_processing_constraint_flag** | u(1) |
| **gci_no_ts_residual_coding_rice_constraint_flag** | u(1) |
| **gci_no_rrc_rice_extension_constraint_flag** | u(1) |
| **gci_no_persistent_rice_adaptation_constraint_flag** | u(1) |
| **gci_no_reverse_last_sig_coeff_constraint_flag** | u(1) |
| numAdditionalBitsUsed = 6 | |
| } else | |
| numAdditionalBitsUsed = 0 | |
| for( i = 0; i < gci_num_additional_bits − numAdditionalBitsUsed; i++ ) | |
| **gci_reserved_zero_bit**[ i ] | u(1) |
| } | |
| while( !byte_aligned( ) ) | |
| **gci_alignment_zero_bit** | f(1) |
| } | |

In one example, the corresponding semantics for gci_num_additional_bits if there are 6 additional general constraint flags for coding tools in VVCv2 is (additions are underlined and deletions are shown in strikethrough):

gci_num_additional_bits specifies the number of the additional GCI bits in the general constraints information syntax structure other than gci_alignment_zero_bit syntax elements (when present). The value of gci_num_additional_bits shall be equal to 0 or 6 in bitstreams conforming to this version of this document. Values other than 0 or 6 for gci_num_additional_bits are reserved for future use by ITU-T|ISO/IEC. Although the value of gci_num_additional_bits is required to be equal to 0 or 6 in this version of this document, decoders conforming to this version of this document shall allow values of gci_num_additional_bits other than 0 or 6 to appear in the syntax and shall ignore the values of all the gci_reserved_zero_bit[i] syntax elements when gci_num_additional_bits is other than 0 or 6.

In the above example of the semantics for gci_num_additional_bits, in addition to value 0 or 6 as discussed above, the gci_num_additional_bits is allowed to take a value other than 0 or 6. In other words, the gci_num_additional_bits can take a value between 1 and 5. The gci_num_additional_bits is also allowed to take a value that is greater than 6. If the gci_num_additional_bits has a value, denoted as M, that is between 1 and 5, according to the syntax shown in Table 1 above, the decoder will skip the steps performed when the "if" condition is true and jump to the "else" step to assign the value of the "numAdditionalBitsUsed" to 0. Then the M bits will be read in the "for" loop and discarded. In this way, the desynchronization issue can be avoided. If the gci_num_additional_bits has a value M that is greater than 6, the six additional general constraint flags will be extracted and the remaining M−6 bits will be further extracted and discarded.

In another example, the corresponding semantics for gci_num_additional_bits if there are 6 additional general constraint flags for coding tools in VVCv2 is (additions are underlined and deletions are shown in strikethrough):

gci_num_additional_bits specifies the number of the additional GCI bits in the general constraints information syntax structure other than gci_alignment_zero_bit syntax elements (when present). The value of gci_num_additional_bits shall be equal to 0 or 6 in bitstreams conforming to this version of this document. Values greater than 4-6 for gci_num_additional_bits are reserved for future use by ITU-T|ISO/IEC. Although the value of gci_num_additional_bits is required to be equal to 0 or 6 in this version of this document, decoders conforming to this version of this document shall allow values of gci_num_additional_bits greater than 6 to appear in the syntax and shall ignore the values of all the gci_reserved_zero_bit[i] syntax elements when gci_num_additional_bits is greater than 6.

In another embodiment of signaling the general constraint information, if a VVCv2 bitstream signals general constraint information (i.e., gci_present_flag has a value of 1), and the VVCv2 general constraint information consists of N additional coding tools that may be constrained, then the syntax element gci_num_additional_bits may be set to a value M. M is in the range of 0 to N inclusive (0≤M≤N). If gci_num_additional_bits is set to 0, then general constraint flags for the N additional coding tools are not signaled. If gci_num_additional_bits is set to a non-zero value of M, then the next M bits in the bitstream are used to signal general constraint flags for M of the N additional coding tools. Which M of the additional coding tools are constrained is determined by the order in which the general constraint flags appear in the general constraint information syntax table.

In one example of this embodiment, the modification to the general constraint information syntax for VVCv2 with the 6 general constraint flags currently proposed for VVCv2 coding tools may be as below:

| | Descriptor |
|---|---|
| general_constraints_info( ) { | |
| **gci_present_flag** | u(1) |
| if( gci_present_flag ) { | |
| /* general */ | |
| **gci_intra_only_constraint_flag** | u(1) |
| **...** | |
| **gci_num_additional_bits** | u(8) |
| if( gci_num_additional_bits > 0 ) | |
| **gci_all_rap_pictures_constraint_flag** | u(1) |
| if( gci_num_additional_bits > 1 ) | |
| **gci_no_extended_precision_processing_constraint_flag** | u(1) |
| if( gci_num_additional_bits > 2 ) | |
| **gci_no_ts_residual_coding_rice_constraint_flag** | u(1) |
| if( gci_num_additional_bits > 3 ) | |
| **gci_no_rrc_rice_extension_constraint_flag** | u(1) |
| if( gci_num_additional_bits > 4 ) | |
| **gci_no_persistent_rice_adaptation_constraint_flag** | u(1) |
| if( gci_num_additional_bits > 5 ) | |
| **gci_no_reverse_last_sig_coeff_constraint_flag** | u(1) |
| if( gci_num_additional_bits > 6 ) { | |
| numAdditionalBitsUsed = 6 | |
| for( i = 0; i < gci_num_additional_bits − numAdditionalBitsUsed; i++ ) | |
| **gci_reserved_zero_bit**[ i ] | u(1) |
| } | |
| } | |
| while( !byte_aligned( ) ) | |
| **gci_alignment_zero_bit** | f(1) |
| } | |

In another example of this embodiment, equivalent behaviour may be achieved with a more compact syntax table:

| | Descriptor |
|---|---|
| general_constraints_info( ) { | |
| **gci_present_flag** | u(1) |
| if( gci_present_flag ) { | |
| /* general */ | |
| **gci_intra_only_constraint_flag** | u(1) |
| **...** | |
| gci_num_additional_bits | u(8) |
| if( gci_num_additional_bits > 0 ) | |
| **gci_all_rap_pictures_constraint_flag** | u(1) |
| if( gci_num_additional_bits > 1 ) | |
| **gci_no_extended_precision_processing_constraint_flag** | u(1) |
| if( gci_num_additional_bits > 2 ) | |
| **gci_no_ts_residual_coding_rice_constraint_flag** | u(1) |
| if( gci_num_additional_bits > 3 ) | |
| **gci_no_rrc_rice_extension_constraint_flag** | u(1) |
| if( gci_num_additional_bits > 4 ) | |
| **gci_no_persistent_rice_adaptation_constraint_flag** | u(1) |
| if( gci_num_additional_bits > 5 ) | |
| **gci_no_reverse_last_sig_coeff_constraint_flag** | u(1) |
| for( i = 0; i < gci_num_additional_bits − 6; i++ ) | |
| **gci_reserved_zero_bit**[ i ] | u(1) |
| } | |
| } | |
| while( !byte_aligned( ) ) | |
| **gci_alignment_zero_bit** | f(1) |
| } | |

Alternative arrangements of this embodiment may be expressed in the general constraints information syntax by changing the order of the general constraint flags for VVCv2 coding tools.

The corresponding semantics for gci_num_additional_bits if there are 6 additional general constraint flags for coding tools in VVCv2 can be as follows:

gci_num_additional_bits specifies the number of the additional GCI bits in the general constraints information syntax structure other than gci_alignment_zero_bit syntax elements (when present). The value of gci_num_additional_bits shall be in the range of 0 to 6 inclusive in bitstreams conforming to this version of this document. Values greater than 6 for gci_num_additional_bits are reserved for future use by ITU-T|ISO/IEC. Although the value of gci_num_additional_bits is required to be in the range of 0 to 6 inclusive in this version of this document, decoders conforming to this version of this document shall allow values of gci_num_additional_bits greater than 6 to appear in the syntax and shall ignore the values of all the gci_reserved_zero_bit[i] syntax elements when gci_num_additional_bits is greater than 6.

In this embodiment, depending on the value of gci_num_additional_bits some or all of the additional general constraint flags may not be signalled. In one arrangement of this embodiment, when a VVCv2 bitstream signals general constraint information (that is if gci_present_flag has a value of 1), no constraint is imposed on coding tools corresponding to additional general constraint flags which are not signalled. This behaviour may be expressed by modifying the semantics for gci_num_additional_bits as follows:

gci_num_additional_bits specifies the number of the additional GCI bits in the general constraints information syntax structure other than gci_alignment_zero_bit syntax elements (when present). The value of gci_num_additional_bits shall be in the range of 0 to 6 inclusive in bitstreams conforming to this version of this document. Values greater than 6 for gci_num_additional_bits are reserved for future use by ITU-T|ISO/IEC. Although the value of gci_num_additional_bits is required to be in the range of 0 to 6 inclusive in this version of this document, decoders conforming to this version of this document shall allow values of gci_num_additional_bits greater than 6 to appear in the syntax and shall ignore the values of all the gci_reserved_zero_bit[i] syntax elements when gci_num_additional_bits is greater than 6. In addition, when gci_present_flag is equal to 1, no constraint is imposed to the coding tools whose corresponding constraint flags are not present in the syntax of general_constraints_info( ).

In another arrangement of this embodiment, when a VVCv2 bitstream signals general constraint information (that is if gci_present_flag has a value of 1) and additional general constraint flags are not signalled, the corresponding tools are constrained. This behaviour may be expressed by modifying the semantics for the additional general constraint flags as follows:

gci_num_additional_bits specifies the number of the additional GCI bits in the general constraints information syntax structure other than gci_alignment_zero_bit syntax elements (when present). The value of gci_num_additional_bits shall be in the range of 0 to 6 inclusive in bitstreams conforming to this version of this document. Values greater than 6 for gci_num_additional_bits are reserved for future use by ITU-T|ISO/IEC. Although the value of gci_num_additional_bits is required to be in the range of 0 to 6 inclusive in this version of this document, decoders conforming to this version of this document shall allow values of gci_num_additional_bits greater than 6 to appear in the syntax and shall ignore the values of all the gci_reserved_zero_bit[i] syntax elements when gci_num_additional_bits is greater than 6.

gci_all_rap_pictures_constraint_flag equal to 1 specifies that all pictures in OlsInScope are GDR pictures with ph_recovery_poc_cnt equal to 0 or IRAP pictures. gci_all_rap_pictures_constraint_flag equal to 0 does not impose such a constraint. When gci_present_flag is equal to 1 and gci_all_rap_pictures_constraint_flag is not present, the value of gci_all_rap_pictures_constraint_flag is inferred to be equal to 1.

gci_no_extended_precision_processing_constraint_flag equal to 1 specifies that sps_extended_precision_flag for all pictures in OlsInScope shall be equal to 0. gci_no_extended_precision_processing_constraint_flag equal to 0 does not impose such a constraint. When gci_present_flag is equal to 1 and gci_no_extended_precision_processing_constraint_flag is not present, the value of gci_no_extended_precision_processing_constraint_flag is inferred to be equal to 1.

gci_no_ts_residual_coding_rice_constraint_flag equal to 1 specifies that sps_ts_residual_coding_rice_present_in_sh_flag for all pictures in OlsInScope shall be equal to 0. gci_no_ts_residual_coding_rice_constraint_ flag equal to 0 does not impose such a constraint. When gci_present_flag is equal to 1 and gci_no_ts_residual_coding_rice_constraint_flag is not present, the value of gci_no_ts_residual_coding_rice_constraint_ flag is inferred to be equal to 1.

gci_no_rrc_rice_extension_constraint_flag equal to 1 specifies that sps_rrc_rice_extension_flag for all pictures in OlsInScope shall be equal to 0. gci_no_rrc_rice_extension_constraint_flag equal to 0 does not impose such a constraint. When gci_present_flag is equal to 1 and gci_no_rrc_rice_extension_constraint_flag is not present, the value of gci_no_rrc_rice_extension_constraint_flag is inferred to be equal to 1.

gci_no_persistent_rice_adaptation_constraint_flag equal to 1 specifies that sps_persistent_rice_adaptation_enabled_flag for all pictures in OlsInScope shall be equal to 0. gci_no_persistent_rice_adaptation_constraint_flag equal to 0 does not impose such a constraint. When gci_present_flag is equal to 1 and gci_no_persistent_rice_adaptation_constraint_flag is not present, the value of gci_no_persistent_rice_adaptation_constraint_ flag is inferred to be equal to 1.

gci_no_reverse_coeff_constraint_flag equal to 1 specifies that sps_reverse_last_sig_coeff_enabled_flag for all pictures in OlsInScope shall be equal to 0. gci_no_reverse_last_sig_coeff_constraint_flag equal to 0 does not impose such a constraint. When gci_present_flag is equal to 1 and gci_no_reverse_last_sig_coeff_constraint_flag is not present, the value of gci_no_reverse_last_sig_coeff_constraint_flag is inferred to be equal to 1.

Initializing General Constraint Information Flags

One embodiment of initializing the general constraint information flags is described to address the ambiguity and inconsistence problems of decoder implementations discussed above. In this embodiment, when gci_present_flag is equal to 1 and gci_num_additional_bits is equal to 0, general_constraints_info( ) does not impose constraint to the coding tools related to gci_all_rap_pictures_constraint_flag, gci_no_extended_precision_processing_constraint_flag, gci_no_ts_residual_coding_rice_constraint_flag, gci_no_reverse_last_sig_coeff_constraint_flag gci_no_rrc_rice_extension_constraint_flag and gci_no_persistent_rice_adaptation_constraint_flag.

As one example, the possible changes to the semantics of gci_num_additional_bits is shown as follows, which is made based upon the current version of VVC version 2 specification (additions are underlined and deletions are shown in strikethrough).

gci_num_additional_bits specifies the number of the additional GCI bits in the general constraints information syntax structure other than gci_alignment_zero_bit syntax elements (when present). The value of gci_num_additional_bits shall be equal to 0 or 1 in bitstreams conforming to this version of this document. Values greater than 1 for gci_num_additional_bits are reserved for future use by ITU-T|ISO/IEC. Although the value of gci_num_additional_bits is required to be equal to 0 or 1 in this version of this document, decoders conforming to this version of this document shall allow values of gci_num_additional_bits greater than 1 to appear in the syntax and shall ignore the values of all the gci_reserved_zero_bit[i] syntax elements when gci_num_additional_bits is greater than 1. When gci_present_flag is equal to 1 and gci_num_additional_bits is equal to 0, general_constraints_info( ) does not impose any constraint to the coding tools related to gci_all_rap_pictures_constraint_flag, gci_no_extended_precision_processing_constraint_flag, gci_no_ts_residual_coding_rice_constraint_flag, gci_no_reverse_last_sig_coeff_constraint_flag gci_no_rrc_rice_extension_constraint_flag and gci_no_persistent_rice_adaptation_constraint_flag.

As another example, the possible changes to the semantics of gci_num_additional_bits are shown as follows, which is made based upon the current version of VVC version 2 specification.

gci_num_additional_bits specifies the number of the additional GCI bits in the general constraints information syntax structure other than gci_alignment_zero_bit syntax elements (when present). The value of gci_num_additional_bits shall be equal to 0 or 6 in bitstreams conforming to this version of this document. Values other than 4-0 or 6 for gci_num_additional_bits are reserved for future use by ITU-T|ISO/IEC. Although the value of gci_num_additional_bits is required to be equal to 0 or 6 in this version of this document, decoders conforming to this version of this document shall allow values of gci_num_additional_bits other than 0 or 6 to appear in the syntax and shall ignore the values of all the gci_reserved_zero_bit[i] syntax elements when gci_num_additional_bits is other than 0 or 6. When gci_present_flag is equal to 1 and gci_num_additional_bits is equal to 0, general_constraints_info( ) does not impose any constraint to the coding tools related to gci_all_rap_pictures_constraint_flag, gci_no_extended_precision_processing_constraint_flag, gci_no_ts_residual_coding_rice_constraint_flag, gci_no_reverse_last_sig_coeff_constraint_flag gci_no_rrc_rice_extension_constraint_flag and gci_no_persistent_rice_adaptation_constraint_flag.

In the current version of VVC version 2 specification, the semantics of gci_num_additional_bits is used only when the gci_present_flag is equal to 1. The scenario for the gci_present_flag equal to 0 is addressed in a different section of the VVC version 2 specification. Therefore, "when gci_present_flag is equal to 1" in the above semantics of gci_num_additional_bits is automatically satisfied. Furthermore, because the VVC version 2 specification does not allow the gci_num_additional_bits to take a value between 1 and 5, "gci_num_additional_bits is equal to 0" is equivalent to "gci_num_additional_bits is smaller than or equal to 5" or "the gci_all_rap_pictures_constraint_flag, gci_no_extended_precision_processing_constraint_flag, gci_no_ts_residual_coding_rice_constraint_flag, gci_no_reverse_last_sig_coeff_constraint_flag gci_no_rrc_rice_extension_constraint_flag and gci_no_persistent_rice_adaptation_constraint_flag are not present." Accordingly, the above changes to the semantics of gci_num_additional_bits are equivalent to the follows:

gci_num_additional_bits specifies the number of the additional GCI bits in the general constraints information syntax structure other than gci_alignment_zero_bit syntax elements (when present). The value of gci_num_additional_bits shall be equal to 0 or 6 in bitstreams conforming to this version of this document. Values other than 4-0 or 6 for gci_num_additional_bits are reserved for future use by ITU-T|ISO/IEC. Although the value of gci_num_additional_bits is required to be equal to 0 or 6 in this version of this document, decoders conforming to this version of this document shall allow values of gci_num_additional_bits other than 0 or 6 to appear in the syntax and shall ignore the values of all the gci_reserved_zero_bit[i] syntax elements when gci_num_additional_bits is other than 0 or 6. When gci_all_rap_pictures_constraint_flag, gci_no_extended_precision_processing_constraint_flag, gci_no_ts_residual_coding_rice_constraint_flag, gci_no_reverse_last_sig_coeff_constraint_flag gci_no_rrc_rice_ extension_constraint_flag and gci_no_persistent_rice_adaptation_constraint_flag are not present, general_constraints_info( ) does not impose any constraint to the coding tools related to gci_all_rap_pictures_constraint_flag, gci_no_extended_precision_processing_constraint_flag, gci_no_ts_residual_coding_rice_constraint_flag, gci_no_reverse_last_sig_coeff_constraint_flag gci_no_rrc_rice_extension_constraint_flag and gci_no_persistent_rice_adaptation_constraint_flag.

Below are several examples in which the inferred values of the additional general constraint flags can be set in a way similar to the semantics described above. For example, the semantics of the additional general constraint flags can be modified as follows to include the inferred value settings:

gci_all_rap_pictures_constraint_flag equal to 1 specifies that all pictures in OlsInScope are GDR pictures with ph_recovery_poc_cnt equal to 0 or IRAP pictures. gci_all_rap_pictures_constraint_flag equal to 0 does not impose such a constraint. When not present, the value of gci_all_rap_pictures_constraint_flag is inferred to be equal to 0.

gci_no_extended_precision_processing_constraint_flag equal to 1 specifies that sps_extended_precision_flag for all pictures in OlsInScope shall be equal to 0. gci_no_extended_precision_processing_constraint_flag equal to 0 does not impose such a constraint. When not present, the value of gci_no_extended_precision_processing_constraint_flag is inferred to be equal to 0.

gci_no_ts_residual_coding_rice_constraint_flag equal to 1 specifies that sps_ts_residual_coding_rice_present_in_sh_flag for all pictures in OlsInScope shall be equal to 0. gci_no_ts_residual_coding_rice_constraint_ flag equal to 0 does not impose such a constraint. When not present, the value of gci_no_ts_residual_coding_rice_constraint_flag is inferred to be equal to 0.

gci_no_rrc_rice_extension_constraint_flag equal to 1 specifies that sps_rrc_rice_extension_flag for all pictures in OlsInScope shall be equal to 0. gci_no_rrc_rice_extension_constraint_flag equal to 0 does not impose such a constraint. When not present, the value of gci_no_rrc_rice_extension_constraint_flag is inferred to be equal to 0.

gci_no_persistent_rice_adaptation_constraint_flag equal to 1 specifies that sps_persistent_rice_adaptation_enabled_flag for all pictures in OlsInScope shall be equal to 0. gci_no_persistent_rice_adaptation_constraint_flag equal to 0 does not impose such a constraint. When not present, the value of gci_no_persistent_rice_adaptation_constraint_flag is inferred to be equal to 0.

gci_no_reverse_last_sig_coeff_constraint_flag equal to 1 specifies that sps_reverse_last_sig_coeff_enabled_flag for all pictures in OlsInScope shall be equal to 0. gci_no_reverse_last_sig_coeff_constraint_flag equal to 0 does not impose such a constraint. When not present, the value of gci_no_reverse_last_sig_coeff_constraint_flag is inferred to be equal to 0.

In another example, the semantics of the additional general constraint flags are modified as follows 0:

gci_all_rap_pictures_constraint_flag equal to 1 specifies that all pictures in OlsInScope are GDR pictures with ph_recovery_poc_cnt equal to 0 or IRAP pictures. gci_all_rap_pictures_constraint_flag equal to 0 does not impose such a constraint. When gci_all_rap_pictures_constraint_flag is not present, its value is inferred to be equal to 0.

gci_no_extended_precision_processing_constraint_flag equal to 1 specifies that sps_extended_precision_flag for all pictures in OlsInScope shall be equal to 0. gci_no_extended_precision_processing_constraint_flag equal to 0 does not impose such a constraint. When gci_no_extended_precision_processing_constraint_flag is not present, its value is inferred to be equal to 0.

gci_no_ts_residual_coding_rice_constraint_flag equal to 1 specifies that sps_ts_residual_coding_rice_present_in_sh_flag for all pictures in OlsInScope shall be equal to 0. gci_no_ts_residual_coding_rice_constraint_ flag equal to 0 does not impose such a constraint. When gci_no_ts_residual_coding_rice_constraint_flag is not present, its value is inferred to be equal to 0.

gci_no_rrc_rice_extension_constraint_flag equal to 1 specifies that sps_rrc_rice_extension_flag for all pictures in OlsInScope shall be equal to 0. gci_no_rrc_rice_extension_constraint_flag equal to 0 does not impose such a constraint. When gci_no_rrc_rice_extension_constraint_flag is not present, its value is inferred to be equal to 0.

gci_no_persistent_rice_adaptation_constraint_flag equal to 1 specifies that sps_persistent_rice_adaptation_enabled_flag for all pictures in OlsInScope shall be equal to 0. gci_no_persistent_rice_adaptation_constraint_flag equal to 0 does not impose such a constraint. When gci_no_persistent_rice_adaptation_constraint_flag is not present, its value is inferred to be equal to 0.

gci_no_reverse_last_sig_coeff_constraint_flag equal to 1 specifies that sps_reverse_last_sig_coeff_enabled_flag for all pictures in OlsInScope shall be equal to 0. gci_no_reverse_last_sig_coeff_constraint_flag equal to 0 does not impose such a constraint. When gci_no_reverse_last_sig_coeff_constraint_flag is not present, its value is inferred to be equal to 0.

In another example, the semantics of gci_num_additional_bits is modified as follows:

gci_num_additional_bits specifies the number of the additional GCI bits in the general constraints information syntax structure other than gci_alignment_zero_bit syntax elements (when present). The value of gci_num_additional_bits shall be equal to 0 or 6 in bitstreams conforming to this version of this document. Values greater than 6 for gci_num_additional_bits are reserved for future use by ITU-T|ISO/IEC. Although the value of gci_num_additional_bits is required to be equal to 0 or 6 in this version of this document, decoders conforming to this version of this document shall allow values of gci_num_additional_bits greater than 6 to appear in the syntax and shall ignore the values of all the gci_reserved_zero_bit[i] syntax elements when gci_num_additional_bits is greater than 6. When gci_num_additional_bits is equal to 0, all the constraint flags specified by the additional GCI bits are inferred to be equal to 0.

In another example, the semantics of gci_num_additional_bits is modified as follows:

gci_num_additional_bits specifies the number of the additional GCI bits in the general constraints information syntax structure other than gci_alignment_zero_bit syntax elements (when present). The value of gci_num_additional_bits shall be equal to 0 or 6 in bitstreams conforming to this version of this document. Values greater than 6 for gci_num_additional_bits are reserved for future use by ITU-T|ISO/IEC. Although the value of gci_num_additional_bits is required to be equal to 0 or 6 in this version of this document, decoders conforming to this version of this document shall allow values of gci_num_additional_bits greater than 6 to appear in the syntax and shall ignore the values of all the gci_reserved_zero_bit[i] syntax elements when gci_num_additional_bits is greater than 4_6. When not present, all the constraint flags specified by the additional GCI bits are inferred to be equal to 0.

In another example, the syntax and semantics of general constraints information syntax elements are modified as follows:

| | Descriptor |
|---|---|
| general_constraints_info( ) { | |
| **gci_present_flag** | u(1) |
| if( gci_present_flag ) { | |
| /* general */ | |
| **gci_intra_only_constraint_flag** | u(1) |
| **...** | |
| **gci_num_additional_bits** | u(8) |
| if( gci_num_additional_bits > ~~0~~ 5 ) { | |
| additional_general_constraints_info( ) | |
| ~~**gci_all_rap_pictures_constraint_flag**~~ | ~~u(1)~~ |
| ~~**gci_no_extended_precision_processing_constraint_flag**~~ | ~~u(1)~~ |
| ~~**gci_no_ts_residual_coding_rice_constraint_flag**~~ | ~~u(1)~~ |
| ~~**gci_no_rrc_rice_extension_constraint_flag**~~ | ~~u(1)~~ |
| ~~**gci_no_persistent_rice_adaptation_constraint_flag**~~ | ~~u(1)~~ |
| ~~**gci_no_reverse_last_sig_coeff_constraint_flag**~~ | ~~u(1)~~ |
| numAdditionalBitsUsed = 6 | |
| } else | |
| numAdditionalBitsUsed = 0 | |
| for( i = 0; i < gci_num_additional_bits − numAdditionalBitsUsed; i++ ) | |
| **gci_reserved_zero_bit**[ i ] | u(1) |

-continued

| | Descriptor |
|---|---|
| } | |
| while( !byte_aligned( ) ) | |
| **gci_alignment_zero_bit** | f(1) |
| } | |
| additional_general_constraints_info( ) { | |
| **gci all rap pictures constraint flag** | u(1) |
| **gci no extended precision processing constraint flag** | u(1) |
| **gci no ts residual coding rice constraint flag** | u(1) |
| **gci no rrc rice extension constraint flag** | u(1) |
| **gci**_no_persistent_rice_adaptation_constraint_flag | u(1) |
| **gci**_no_reverse_last_sig_coeff_constraint_flag | u(1) |
| } | |

gci_num_additional_bits specifies the number of the additional GCI bits in the general constraints information syntax structure other than gci_alignment_zero_bit syntax elements (when present). The value of gci_num_additional_bits shall be equal to 0 or 6 in bitstreams conforming to this version of this document. Values greater than 6 for gci_num_additional_bits are reserved for future use by ITU-T|ISO/IEC. Although the value of gci_num_additional_bits is required to be equal to 0 or 6 in this version of this document, decoders conforming to this version of this document shall allow values of gci_num_additional_bits greater than 6 to appear in the syntax and shall ignore the values of all the gci_reserved_zero_bit[i] syntax elements when gci_num_additional_bits is greater than 4_6. When gci_num_additional_bits is equal to 0, the additional general_constraints_info( ) syntax structure does not impose any constraint.

In another example, semantics of general constraint information syntax elements are modified as follows:

gci_num_additional_bits specifies the number of the additional GCI bits in the general constraints information syntax structure other than gci_alignment_zero_bit syntax elements (when present). The value of gci_num_additional_bits shall be equal to 0 or 6 in bitstreams conforming to this version of this document. Values greater than 4-6 for gci_num_additional_bits are reserved for future use by ITU-T|ISO/IEC. Although the value of gci_num_additional_bits is required to be equal to 0 or 6 in this version of this document, decoders conforming to this version of this document shall allow values of gci_num_additional_bits greater than 6 to appear in the syntax and shall ignore the values of all the gci_reserved_zero_bit[i] syntax elements when gci_num_additional_bits is greater than 4_6. When not present, the additional general_constraints_info( ) syntax structure does not impose any constraint.

In another embodiment of initializing the general constraint information flags, when gci_present_flag is equal to 1 and gci_num_additional_bits is equal to 0, gci_all_rap_pictures_constraint_flag, gci_no_extended_precision_processing_constraint_flag, gci_no_ts_residual_coding_rice_constraint_flag, gci_no_reverse_last_sig_coeff_constraint_flag gci_no_rrc_rice_extension_constraint_flag and gci_no_persistent_rice_adaptation_constraint_flag may always impose the corresponding constraint specified by the individual semantics of these flags. In other words, these six GCI flags are inferred to be equal to 1 when GCI flags are present and gci_num_additional_bits is equal to 0.

As one example, the possible changes to the semantics of gci_num_additional_bits are shown as follows, which is made based upon the current additions of VVC version 2 specification.

gci_num_additional_bits specifies the number of the additional GCI bits in the general constraints information syntax structure other than gci_alignment_zero_bit syntax elements (when present). The value of gci_num_additional_bits shall be equal to 0 or 1 in bitstreams conforming to this version of this document. Values greater than 1 for gci_num_additional_bits are reserved for future use by ITU-T|ISO/IEC. Although the value of gci_num_additional_bits is required to be equal to 0 or 1 in this version of this document, decoders conforming to this version of this document shall allow values of gci_num_additional_bits greater than 1 to appear in the syntax and shall ignore the values of all the gci_reserved_zero_bit[i] syntax elements when gci_num_additional_bits is greater than 1. When gci_present_flag is equal to 1 and gci_num_additional_bits is equal to 0, gci_all_rap_pictures_constraint_flag. gci_no_extended_precision_processing_constraint_flag, gci_no_ts_residual_coding_rice_constraint_flag, gci_no_reverse_last_sig_coeff_constraint_flag gci_no_rrc_rice_extension_constraint_flag and gci_no_persistent_rice_adaptation_constraint_flag are inferred to be equal to 1.

As another example, the possible changes for the semantics of gci_num_additional_bits are shown as follows, which is made based upon the current additions of VVC version 2 specification.

gci_num_additional_bits specifies the number of the additional GCI bits in the general constraints information syntax structure other than gci_alignment_zero_bit syntax elements (when present). The value of gci_num_additional_bits shall be equal to 0 or 6 in bitstreams conforming to this version of this document. Values other than 4-0 or 6 for gci_num_additional_bits are reserved for future use by ITU-T|ISO/IEC. Although the value of gci_num_additional_bits is required to be equal to 0 or 6 in this version of this document, decoders conforming to this version of this document shall allow values of gci_num_additional_bits other than 0 or 6 to appear in the syntax and shall ignore the values of all the gci_reserved_zero_bit[i] syntax elements when gci_num_additional_bits is other than 0 or 6. When gci_present_flag is equal to 1 and gci_num_additional_bits is equal to 0, gci_all_rap_pictures_constraint_flag, gci_no_extended_precision_processing_constraint_flag, gci_no_ts_residual_coding_rice_constraint_flag, gci_no_reverse_last_sig_coeff_constraint_flag gci_no_rrc_rice_extension_constraint_flag and gci_no_persistent_rice_adaptation_constraint_flag are inferred to be equal to 1.

Additional or alternative to the embodiments discussed above, the syntax element misleading gci_reserved_zero_bit[i] can renamed to gci_reserved_bit[i]. For example, the modified syntax and semantics may be as follows:

| | Descriptor |
|---|---|
| general_constraints_info( ) { | |
| **gci_present_flag** | u(1) |
| if( gci_present_flag ) { | |
| /* general */ | |
| **gci_intra_only_constraint_flag** | u(1) |
| ... | |
| **gci_num_additional_bits** | u(8) |
| if( gci_num_additional_bits > ~~0~~ 5 ) { | |
| **gci_all_rap_pictures_constraint_flag** | u(1) |
| **gci_no_extended_precision_processing_constraint_flag** | u(1) |
| **gci_no_ts_residual_coding_rice_constraint_flag** | u(1) |
| **gci_no_rrc_rice_extension_constraint_flag** | u(1) |
| **gci_no_persistent_rice_adaptation_constraint_flag** | u(1) |
| **gci_no_reverse_last_sig_coeff_constraint_flag** | u(1) |
| numAdditionalBitsUsed = 6 | |
| } else | |
| numAdditionalBitsUsed = 0 | |
| for( i = 0; i < gci_num_additional_bits − numAdditionalBitsUsed; i++ ) | |
| ~~**gci_reserved_zero_bit**[ i ]~~ **gci_reserved_bit**[ i ] | u(1) |
| } | |
| while( !byte_aligned( ) ) | |
| **gci_alignment_zero_bit** | f(1) |
| } | |

gci_reserved_bit[i] could have any value. Its presence and value do not affect the decoding process specified in this version of this Specification. Decoders conforming to this version of this Specification shall ignore the values of all the gci_reserved_bit[i] syntax elements.

In a further embodiment, the syntax element gci_reserved_zero_bit[i] is renamed to gci_reserved_bit[i]. For example, the modified syntax and semantics may be as follows:

| | Descriptor |
|---|---|
| general_constraints_info( ) { | |
| **gci_present_flag** | u(1) |
| if( gci_present_flag ) { | |
| /* general */ | |
| **gci_intra_only_constraint_flag** | u(1) |
| ... | |
| **gci_num_additional_bits** | u(8) |
| if( gci_num_additional_bits > ~~0~~ 5 ) { | |
| **gci_all_rap_pictures_constraint_flag** | u(1) |
| **gci_no_extended_precision_processing_constraint_flag** | u(1) |
| **gci_no_ts_residual_coding_rice_constraint_flag** | u(1) |
| **gci_no_rrc_rice_extension_constraint_flag** | u(1) |
| **gci_no_persistent_rice_adaptation_constraint_flag** | u(1) |
| **gci_no_reverse_last_sig_coeff_constraint_flag** | u(1) |
| numAdditionalBitsUsed = 6 | |
| } else | |
| numAdditionalBitsUsed = 0 | |
| for( i = 0; i < gci_num_additional_bits − numAdditionalBitsUsed; i++ ) | |
| ~~**gci_reserved_zero_bit**[ i ]~~ **gci_reserved_bit**[ i ] | u(1) |
| } | |
| while( !byte_aligned( ) ) | |
| **gci_alignment_zero_bit** | f(1) |
| } | |

gci_reserved_bit[i] could have any value. Its presence and value do not affect the decoding process specified in this version of this Specification. Decoders conforming to this version of this Specification shall ignore the values of all the gci_reserved_bit[i] syntax elements.

General Constraint Flags gci_all_rap_pictures_constraint_flag gci_all_rap_pictures_constraint_flag is used to indicate the restriction on pictures to be either IRAP or GDR pictures.

The network abstraction layer (NAL) is a system interface that organizes VVC syntax elements into "NAL units". Such structure allows simple and effective customization of VVC to a broad variety of use cases, ranging from real time communication applications to file formats for storage applications. The full list of NAL unit types in the VVC standard are in the table below:

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture* slice_layer_rbsp( ) | VCL |
| 1 | STSA_NUT | Coded slice of an STSA picture or subpicture* slice_layer_rbsp( ) | VCL |
| 2 | RADL_NUT | Coded slice of a RADL picture or subpicture* slice_layer_rbsp( ) | VCL |
| 3 | RASL_NUT | Coded slice of a RASL picture or subpicture* slice_layer_rbsp( ) | VCL |
| 4 . . . 6 | RSV_VCL_4 . . . RSV_VCL_6 | Reserved non-IRAP VCL NAL unit types | VCL |
| 7<br>8 | IDR_W_RADL<br>IDR_N_LP | Coded slice of an IDR picture or subpicture* slice_layer_rbsp( ) | VCL |
| 9 | CRA_NUT | Coded slice of a CRA picture or subpicture* slice_layer_rbsp( ) | VCL |
| 10 | GDR_NUT | Coded slice of a GDR picture or subpicture* slice_layer_rbsp( ) | VCL |
| 11 | RSV_IRAP_11 | Reserved IRAP VCL NAL unit type | VCL |
| 12 | OPI_NUT | Operating point information operating_point_information_rbsp( ) | non-VCL |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17<br>18 | PREFIX_APS_NUT<br>SUFFIX_APS_NUT | Adaptation parameter set adaptation_parameter_set_rbsp( ) | non-VCL |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23<br>24 | PREFIX_SEI_NUT<br>SUFFIX_SEI_NUT | Supplemental enhancement information sei_rbsp( ) | non-VCL |
| 25 | FD_NUT | Filler data filler_data_rbsp( ) | non-VCL |
| 26<br>27 | RSV_NVCL_26<br>RSV_NVCL_27 | Reserved non-VCL NAL unit types | non-VCL |
| 28 . . . 31 | UNSPEC_28 . . . UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

NAL units classified as video coding layer (VCL) contain low level syntax elements, while those classified as non-VCL contain high level syntax elements. Pictures of the video sequence are decoded from VCL NAL units. Different types of VCL categories are useful at a high level to indicate dependencies. For example, NAL units from TRATL, NUT (0) through to RSV_VCL_6 (6) in general may use inter-prediction tools which depend on having access to previously decoded (reference) pictures. Pictures encoded with inter-prediction tools can be compressed more efficiently than those compressed only with intra-prediction tools. However, this decoding dependency introduces problems in situations where the reference pictures may not be available.

Intra random access point (IRAP) picture is a coded picture for which all VCL NAL units have the same value of nal_unit_type in the range of IDR_W_RADL to CRA_NUT, inclusive. An IRAP picture could be a CRA picture or an IDR picture. An IRAP picture does not use inter prediction from reference pictures in the same layer in its decoding process. The first picture in the bitstream in decoding order is an IRAP or Gradual decoder refresh (GDR) picture. For a single-layer bitstream, provided the necessary parameter sets are available when they need to be referenced, the IRAP picture and all subsequent non-RASL pictures in the CLVS in decoding order are correctly decodable without performing the decoding process of any pictures that precede the IRAP picture in decoding order. The value of pps_mixed_nalu_types_in_pic_flag for an IRAP picture is equal to 0. When pps_mixed_nalu_types_in_pic_flag is equal to 0 for a picture, and any slice of the picture has nal_unit_type in the range of IDR_W_RADL to CRA_NUT, inclusive, all other slices of the picture have the same value of nal_unit_type, and the picture is known to be an IRAP picture after receiving the first slice.

As such, IRAP pictures do not use inter prediction across the same layer. This restriction allows IRAP pictures to be error recovery points for streaming video applications, or seeking locations for video on demand playback applications. However, IRAP pictures are generally compressed less efficiently than non-IRAP pictures.

Gradual decoder refresh (GDR) pictures were introduced in the VVC standard as a trade-off between the non-IRAP and IRAP pictures. GDR pictures have some "clean" part which does not use inter prediction, while the remaining part of the picture is free to use inter prediction. By dividing the picture up in this manner, in the event of an error event such as a lost packet, the "clean" part will still be correctly decoded. Over successive GDR pictures the spatial location of the "clean" part is rotated, so that eventually the entire picture can recover from an error.

For video applications where streaming resilience of playback flexibility is important, it may be desirable to restrict all pictures to be either IRAP or GDR pictures. In VVCv2, the GCI flag gci_all_rap_pictures_constraint_flag was introduced so that such a restriction can be indicated at a high level. gci_all_rap_pictures_constraint_flag equal to 1 specifies that all pictures in OlsInScope are GDR pictures with ph_recovery_poc_cnt equal to 0 or IRAP pictures. gci_all_rap_pictures_constraint_flag equal to 0 does not impose such a constraint. When gci_all_rap_pictures_constraint_flag is not present, its value is inferred to be equal to 0.

When the profile_tier_level( ) syntax structure is included in a VPS, the OlsInScope is one or more output layer sets (OLSs) specified by the VPS. When the profile_tier_level( ) syntax structure is included in an SPS, the OlsInScope is the OLS that includes only the layer that is the lowest layer among the layers that refer to the SPS, and this lowest layer is an independent layer.

gci_no_extended_precision_processing_constraint_flag

The GCI flag gci_no_extended_precision_processing_constraint_flag signals at a high level whether the VVCv2 tool of extended transform precision is constrained. In the VVC standard, the pixel of video signals are represented by integer values. All calculations and processing described in the VVC standard are expressed by operations on integers. This restriction is important both for complexity and interoperability reasons. Firstly, integer operations (addition, multiplication, division) are typically less computationally expensive to perform than the equivalent floating point operations. Secondly, floating point operations are not deterministically standardised. Floating point additions and multiplications are not necessarily commutative (e.g., (a+b)+c is not necessarily equal to a+(b+c)), and the evaluation of floating point operations across different platforms is not guaranteed to be identical.

The bit depth of the video signal samples is a property of the video source and is labelled BitDepth in the VVC standard. In the hybrid video coding system, the video samples are predicted by either an inter-frame prediction or intra-frame prediction tool. The difference between the original video samples and the prediction samples is called the residual. In the worst case, these residual coefficients may have expanded bit depth (for example, BitDepth+1); however, in the VVC standard they are clipped to maintain a bit depth of BitDepth. In practice the worst case does not occur because a practical encoder would not choose a prediction tool that produces a residual with larger magnitudes than the original video signal.

Residual coefficients are then typically analysed by an integerised discrete cosine transform (DCT) to produce transform coefficients. The discrete cosine transform (DCT) is a linear, invertible function which may be formally represented by $$f:\mathbb{R}^N \to \mathbb{R}^N$$

where $\mathbb{R}^N$ denotes the N-dimensional space of real numbers. An integerised approximation of the DCT is used in the VVC standard i.e., $$(\text{i.e., } f:\mathbb{Z}^N \to \mathbb{Z}^N).$$

Unlike prediction, some expansion in bit depth is typically allowed at the transform stage as the precision of the transform affects the coding gain. The bit depth of the approximated DCT coefficients and the bit depth of the resulting transform coefficients are design decisions that trade-off hardware complexity against coding performance.

In VVCv1, the transform coefficients have a bit depth of 16. That is, each transform coefficient takes a value within the range $[-2^{15}, 2^{15}-1]$. Multiplication of the video samples by the integerised DCT coefficients generally results in intermediate transform coefficients that have bit depth larger than 16. To produce transform coefficients with the desired bit depth, the intermediate transform coefficients are bit shifted to the right. Such an operation is inherently lossy.

In VVCv2, extended transform precision is enabled by setting the SPS flag sps_extended_precision_flag to 1. If extended transform precision is enabled, the transform coefficients bit depth is increased to (Log 2TransformRange+1). The exact transform coefficient bit depth is dependent on BitDepth. sps_extended_precision_flag equal to 1 specifies that an extended dynamic range is used for transform coefficients in the scaling and transformation processes and for binarization of the abs_remaining[ ] and dec_abs_level [ ] syntax elements. sps_extended_precision_flag equal to 0 specifies that the extended dynamic range is not used in the scaling and transformation processes and is not used for binarization of the abs_remaining[ ] and dec_abs_level[ ] syntax elements. When not present, the value of sps_extended_precision_flag is inferred to be equal to 0. The variable Log 2TransformRange is derived as follows:

```
Log2TransformRange = sps_extended_precision_flag ? Max( 15, Min(
20, BitDepth + 6 ) ) : 15
  CoeffMin = −( 1 << (sps_extended_precision_flag ? Max( 15, Min(
  20, BitDepth + 6 ) ) : 15 ) )
  CoeffMax = (1 << ( sps_extended_precision_flag ? Max( 15, Min(
  20, BitDepth + 6 ) ) : 15 ) ) − 1
```

gci_no_extended_precision_processing_constraint_flag equal to 1 specifies that sps_extended_precision_flag for all pictures in OlsInScope shall be equal to 0. OlsInScope is also referred to herein as the "in-scope output layer set." When the profile_tier_level( ) syntax structure is included in a VPS, the OlsInScope is one or more OLSs specified by the VPS. When the profile_tier_level( ) syntax structure is included in an SPS, the OlsInScope is the OLS that includes only the layer that is the lowest layer among the layers that refer to the SPS, and this lowest layer is an independent layer. gci_no_extended_precision_processing_constraint_flag equal to 0 does not impose such a constraint. When gci_no_extended_precision_processing_constraint_flag is not present, its value is inferred to be equal to 0.

gci_no_ts_residual_coding_rice_constraint_flag

The GCI flag gci_no_ts_residual_coding_rice_constraint_ flag signals at a high level whether the VVCv2 tool of explicit Rice parameter signaling is constrained. At entropy coding, each of the syntax element values is encoded by an entropy coding process into a sequence of bits which are inserted into the bitstream.

Two entropy coding processes used in VVC are context-adaptive binary arithmetic coding (CABAC), and Rice coding. The CABAC engine is adaptive and able to compress syntax elements to bitrates very close to the theoretical Shannon limit. However, arithmetic coding is complex. To encode a non-binary syntax element (for example, a syntax element with values ranging more than 0 or 1) with CABAC, the syntax element is first binarized to a set of "bins". Tables below give two examples of binarizations. The second example demonstrates that for variable length binarizations, bins may not be present for some values of the syntax element.

TABLE fixed length binarization example

| Value | Binarization |
|---|---|
| 0 | 00 |
| 1 | 01 |
| 2 | 10 |
| 3 | 11 |

TABLE variable length binarization example

| Value | Binarization |
|---|---|
| 0 | 0 |
| 1 | 10 |
| 2 | 110 |
| 3 | 1110 |
| 4 | 1111 |

Each bin in the binarization may be encoded by the CABAC engine. However, to encode a bin with CABAC, the engine must store and update an associated "context". The context models the probability distribution of the bin. A separate context is needed for each bin in the syntax element's binarization.

Syntax elements with a large range in values are undesirable to encode purely with CABAC because such syntax elements will have long binarizations, and therefore cause excessive overheads in terms of context storage and update. For example, residual coefficient values are inconvenient to encode purely with CABAC. In contrast with CABAC, Rice coding is capable of modeling the probability distribution of non-binary values with compact parameters.

Rice coding may also be known as Golomb coding, or Rice-Golomb coding. Golomb coding is an entropy coder controlled by a single parameter M which is restricted to be a positive integer. Rice coding is a subset of Golomb coding, where the entropy coder is controlled by a single Rice parameter R such that R is a non-negative integer. A Rice code with Rice parameter R is equivalent to a Golomb coder where $M=2^R$.

A non-negative integer value x is binarized to a Rice code with Rice parameter R as follows. A quotient q and remainder r are calculated by:

$$q = \text{floor}\left(\frac{x}{2^R}\right)$$

$$r = x \text{ modulo } 2^R$$

The Rice code for x is the concatenation of a prefix code and a suffix code. The prefix code is determined by a unary code for q. For example, the prefix code used in VVC is the truncated unary code:

| q | Unary code |
|---|---|
| 0 | 0 |
| 1 | 10 |
| 2 | 110 |
| 3 | 1110 |
| 4 | 11110 |
| 5 | 111110 |
| 6 | 111111 |

As the unary code is truncated, the Rice code is also truncated, which means that the range of values of x that can be encoded is finite. In VVC the truncated Rice code is applied to values of x in the range $[0, 6*2^R]$.

The suffix code is the fixed length code binarization of r with R bits. For example, if R=3 the suffix code is:

| r | Fixed length code |
|---|---|
| 0 | 000 |
| 1 | 001 |
| 2 | 010 |
| 3 | 011 |
| 4 | 100 |
| 5 | 101 |
| 6 | 110 |
| 7 | 111 |

In VVC, residual coefficients are coded by a combination of CABAC, Rice coding, and exponential Golomb coding. A small number of syntax element flags are defined which are sufficient to signal the value of small magnitude residuals. For example, sig_coeff_flag indicates whether the residual magnitude is zero or non-zero. If sig_coeff_flag is 1, then further flags may be signalled, generally named abs_level_gtx_flag, which indicate whether the residual magnitude is greater than 1, 2, 3, and so on. These flags are context coded by the CABAC engine. As the majority of residual coefficients are small in magnitude, most of the residuals can be coded efficiently by CABAC with a relatively small number of bins.

Any remaining magnitude of the residual coefficient that cannot be signalled by the residual coefficient flags is signalled in the syntax element abs_remainder. If the value of abs_remainder is less than or equal to 6*2R, this syntax element is signalled wholly by the Rice code for abs_remainder. If it is greater than $6*2^R$, then the syntax element is signalled by the concatenation of the Rice code for $6*2^R$, and the exponential Golomb code for (abs_remainder−$6*2^R$). The exponential Golomb coding process is not described here.

Although Rice coding is simpler than CABAC, under appropriate conditions Rice coding can also be effective at compressing to low bitrates. For residual coefficients which are all small valued, Rice coding with a small Rice parameter is more efficient. Conversely, when some residual coefficients are large valued, a larger Rice parameter may be suitable. To adjust to the statistics of the residual coefficients, the Rice parameter is determined adaptively from a value locSumAbs, which is calculated from the magnitude of neighbouring residual coefficients.

| | locSumAbs | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| cRiceParam | 0 | 0 | 0 | 0 | 0 | 0 | 0 | 1 | 1 | 1 | 1 | 1 | 1 | 1 | 2 | 2 |

| | locSumAbs | | | | | | | | | | | | | | | |
|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

The adaptive Rice parameter determination was designed for residual coefficients in "regular residual coding" (RRC), which is residual coefficients that have resulted from performing a discrete cosine transform (DCT). However, in VVCv1 it was also applied to residual coefficients in "transform-skip residual coding" (TSRC). In VVCv2 it was recognised that an alternative mechanism for determining the Rice parameter may be beneficial for transform-skip coefficients.

The alternative mechanism in VVCv2 allows the Rice parameter to be explicitly signalled by a slice-level syntax element sh_ts_residual_coding_rise_idx_minus1. When this syntax element is signalled, the Rice parameter is set to R=sh_ts_residual_coding_rise_idx_minus1+1. This value for the Rice parameter persists for the duration of the slice.

| | |
|---|---|
| if( sps_transform_skip_enabled_flag && !sh_dep_quant_used_flag && !sh_sign_data_hiding_used_flag ) | |
| **sh_ts_residual_coding_disabled_flag** | u(1) |
| if( !sh_ts_residual_coding_disabled_flag && sps_ts_residual_coding_rice_present_in_sh_flag ) | |
| **sh_ts_residual_coding_rice_idx_minus1** | u(3) |
| if( sps_reverse_last_sig_coeff_enabled_flag ) | |
| **sh_reverse_last_sig_coeff_flag** | u(1) |
| if( pps_slice_header_extension_present_flag ) { | |
| **sh_slice_header_extension_length** | ue(v) |

sh_ts_residual_coding_rice_idx_minus1 plus 1 specifies the Rice parameter used for the residual_ts_coding( ) syntax structure in the current slice. When not present, the value of sh_ts_residual_coding_rice_idx_minus1 is inferred to be equal to 0.

Whether the alternative mechanism is enabled or not is controlled by the SPS-level flag sps_ts_residual_coding_rice_present_in_sh_flag. If this flag is set to 0, then the alternative Rice parameter signaling is not enabled. The GCI flag gci_no_ts_residual_coding_rice_constraint_flag signals at a high level whether the VVCv2 tool of explicit Rice parameter signaling is constrained. gci_no_ts_residual_coding_rice_constraint_flag equal to 1 specifies that sps_ts_residual_coding_rice_present_in_sh_flag for all pictures in OlsInScope shall be equal to 0. gci_no_ts_residual_coding_rice_constraint_flag equal to 0 does not impose such a constraint. When gci_no_ts_residual_coding_rice_constraint_flag is not present, its value is inferred to be equal to 0.

gci_no_rrc_rice_extension_constraint_flag gci_no_rrc_rice_extension_constraint_flag specifies the sps_rrc_rice_extension_flag for all pictures in OlsInScope. gci_no_rrc_rice_extension_constraint_flag equal to 1 specifies that sps_rrc_rice_extension_flag for all pictures in OlsInScope shall be equal to 0. gci_no_rrc_rice_extension_constraint_flag equal to 0 does not impose such a constraint.

For high bit depth and high bit rate applications, there are many large quantization levels for many positions for RRC. Larger Rice parameters for such application will lead to a smaller number of bins needed to represent the remaining levels. The way to derive Rice parameter in VVCv1 may not be optimal for VVCv2 applications. As such, alternative Rice parameter derivation may be employed which can signaled by sps_rrc_rice_extension_flag. sps_rrc_rice_extension_flag equal to 1 specifies that an alternative Rice parameter derivation for the binarization of abs_remaining[ ] and dec_abs_level[ ] is used. sps_rrc_rice_extension_flag equal to 0 specifies that the alternative Rice parameter derivation for the binarization of abs_remaining[ ] and dec_abs_level[ ] is not used. When not present, the value of sps_rrc_rice_extension_flag is inferred to be equal to 0.

The following shows an example of using sps_rrc_rice_extension_flag in VVC v2 to determine the Rice parameter. Given the array AbsLevel[x][y] for the transform block with component index cIdx and the top-left luma location (x0, y0), the variable locSumAbs is derived as specified by the following pseudo-code process (underlines are additions for VVCv2 over VVCv1):

```
locSumAbs = 0
if( xC < ( 1 << AbsLlog2TbWidth ) − 1 ) {
   locSumAbs += AbsLevel[ xC + 1 ][ yC ]
   if( xC < ( 1 << AbsLlog2TbWidth ) − 2 )
      locSumAbs += AbsLevel[ xC + 2 ][ yC ]
   else
      locSumAbs += HistValue
   if( yC < ( 1 << AbsLlog2TbHeight ) − 1 )
      locSumAbs += AbsLevel [ xC + 1 ][ yC + 1 ]                    (1517)
   else
      locSumAbs += HistValue
} else
   locSumAbs += 2 * HistValue
if( yC < ( 1 << AbsLlog2TbHeight ) − 1 ) {
   locSumAbs += AbsLevel[ xC ][ yC + 1 ]
   if( yC < ( 1 << AbsLlog2TbHeight ) − 2 )
      locSumAbs += AbsLevel[ xC ][ yC + 2 ]
   else
      locSumAbs += HistValue
} else
   locSumAbs += HistValue
The lists Tx[ ] and Rx[ ] are specifed as follows:
Tx[ ] = { 32, 128, 512, 2048 }                                    (1523)
Rx[ ] = { 0, 2, 4, 6, 8 }                                         (1524)
The value of the variable shiftVal is derived as follows:
if( !sps_rrc_rice_extension_flag )
      shiftVal = 0                                                (1526X1)
else
   shiftVal = ( localSumAbs < Tx[ 0 ] ) ? Rx[ 0 ] : ( ( localSumAbs < Tx[ 1 ] ) ?
Rx[ 1 ] :
      ( ( localSumAbs < Tx[ 2 ] ) ? Rx[ 2 ] : ( ( localSumAbs < Tx[ 3 ] ) ? Rx[ 3 ] :
Rx[4] ) ) )
```

-continued

| |
|---|
| The value of locSumAbs is updated as follows: |
| locSumAbs = Clip3( 0, 31, ( locSumAbs >> shiftVal ) − baseLevel * 5 ) (1526X2) |
| Given the variable locSumAbs, the Rice parameter cRiceParam is firstly derived as specified in Table 128, and then updated as follows: |
| cRiceParam = cRiceParam + shiftVal (1526X3) |
| When baseLevel is equal to 0, the variable ZeroPos[ n ] is derived as follows: |
| ZeroPos[ n ] = ( QState < 2 ? 1 : 2 ) << cRiceParam (1518) |

TABLE 128

Specification of cRiceParam based on locSumAbs

| | locSumAbs | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| cRiceParam | 0 | 0 | 0 | 0 | 0 | 0 | 0 | 1 | 1 | 1 | 1 | 1 | 1 | 1 | 2 | 2 |
| | locSumAbs | | | | | | | | | | | | | | | |
| | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

From (1526×3), we can see that the cRiceParam which is used to binarize the remaining of absolute level may be bigger in VVCv2 compared to VVCv1.

gci_no_persistent_rice_adaptation_constraint_flag gci_no_persistent_rice_adaptation_constraint_flag signals constraints on the Rice parameter derivation for the binarization using previous TU state. gci_no_persistent_rice_adaptation_constraint_flag equal to 1 specifies that sps_persistent_rice_adaptation_enabled_flag for all pictures in OlsInScope shall be equal to 0. gci_no_persistent_rice_adaptation_constraint_flag equal to 0 does not impose such a constraint. When gci_no_persistent_rice_adaptation_constraint_flag is not present, its value is inferred to be equal to 0.

sps_persistent_rice_adaptation_enabled_flag equal to 1 specifies that Rice parameter derivation for the binarization of abs_remainder[ ] and dec_abs_level[ ] is initialized at the start of each TU using statistics accumulated from previous TUs. sps_persistent_rice_adaptation_enabled_flag equal to 0 specifies that no previous TU state is used in Rice parameter derivation. When not present, the value of sps_persistent_rice_adaptation_enabled_flag is inferred to be equal to 0. The following shows an example of using sps_persistent_rice_adaptation_enabled_flag in VVCv2 to determine the Rice parameter (underlines are additions for VVCv2 over VVCv1).

If the CTU is the first CTU in a slice or tile, the initialization process for context variables is invoked as specified in subclause 9.3.2.2, the array PredictorPaletteSize[chType], with chType=0, 1, is initialized to 0 and the array StatCoeff[i], with i=0 . . . 2, is initialized as follows:

StatCoeff[*i*]=s ps_persistent_rice_adaptation_enabled_flag?2*Floor (Log 2(BitDepth−10):0 (1513X3)

StatCoeff[i] is used to calculate HisValue which is used to calculate locSumAbs in (1517) and may be updated once per TU. The derivation of Rice parameter for those positions located at block boundary may have more accurate values with help of HisValue.

gci_no_reverse_last_sig_coeff_constraint_flag gci_no_reverse_last_sig_coeff_constraint_flag equal to 1 specifies that sps_reverse_last_sig_coeff_enabled_flag for all pictures in OlsInScope shall be equal to 0. gci_no_reverse_last_sig_coeff_constraint_flag equal to 0 does not impose such a constraint. When gci_no_reverse_last_sig_coeff_constraint_flag is not present, its value is inferred to be equal to 0.

In the regular residual coding (RRC), the position (x,y) of last non-zero level in a TU is coded with up to four syntax elements, last_sig_coeff_x_prefix, last_sig_coeff_y_prefix, last_sig_coeff_x_suffix, last_sig_coeff_y_suffix. This position is coded with difference between (x,y) and (0,0) of current TU in the VVCv1. This is reasonable for VVCv1 because there are many zero levels within one TU and most non-zero levels are located at the top-left corner of TU. However, this may not be true for VVCv2 applications and many non-zero levels spread out the whole TU and it may be beneficial to code this position (x,y) relative to the bottom-right corner instead of top-left (0,0) corner. sh_reverse_last_sig_coeff_flag provides such a tool to handle this kind of application.

sh_reverse_last_sig_coeff_flag equal to 1 specifies that the coordinates of the last significant coefficient are coded relative to ((Log 2ZoTbWidth<<1)−1, (Log 2ZoTbHeight<<1)−1) for each transform block of the current slice. sh_reverse_last_sig_coeff_flag equal to 0 specifies that the coordinates of the last significant coefficient are coded relative to (0, 0) for each transform block of the current slice. When not present, the value of sh_reverse_last_sig_coeff_flag is inferred to be equal to 0.

sh_reverse_last_sig_coeff_flag is conditionally parsed with sps_reverse_last_sig_coeff_enabled_flag in slice header as follows.

If last_sig_coeff_x_suffix is not present, the following applies:

LastSignificantCoeff*X*=last_sig_coeff_*x*_prefix (193)

Otherwise (last_sig_coeff_x_suffix is present), the following applies:

$$\text{LastSignificantCoeff}X=(1<<((\text{last\_sig\_coeff\_}x\text{\_prefix}>>1)-1))*(2+(\text{last\_sig\_coeff\_}x\text{\_prefix }\&1))+\text{last\_sig\_coeff\_}x\text{\_suffix} \quad (194)$$

When sh_reverse_last_sig_coeff_flag is equal to 1, the value of LastSignificantCoeffX is modified as follows:

$$\text{LastSignificantCoeff}X=(1<<\text{Log 2ZoTbWidth})-1-\text{LastSignificantCoeff}X \quad (195)$$

If last_sig_coeff_y_suffix is not present, the following applies:

$$\text{LastSignificantCoeff}Y=\text{last\_sig\_coeff\_}y\text{\_prefix} \quad (196)$$

Otherwise (last_sig_coeff_y_suffix is present), the following applies:

$$\text{LastSignificantCoeff}Y=(1<<((\text{last\_sig\_coeff\_}y\text{\_prefix}>>1)-1))*(2+(\text{last\_sig\_coeff\_}y\text{\_prefix }\&1))+\text{last\_sig\_coeff\_}y\text{\_suffix} \quad (197)$$

When sh_reverse_last_sig_coeff_flag is equal to 1, the value of LastSignificantCoeffY is modified as follows:

$$\text{LastSignificantCoeff}Y=(1<<\text{Log 2ZoTbHeight})-1-\text{LastSignificantCoeff}Y \quad (198)$$

VVCv2 Slice Header

| | |
|---|---|
| if( sps_transform_skip_enabled_flag && !sh_dep_quant_used_flag && !sh_sign_data_hiding_used_flag ) | |
| **sh_ts_residual_coding_disabled_flag** | u(1) |
| if( !sh_ts_residual_coding_disabled_flag && sps_ts_residual_coding_rice_present_in_sh_flag ) | |
| **sh_ts_residual_coding_rice_idx_minus1** | u(3) |
| if( sps_reverse_last_sig_coeff_enabled_flag ) | |
| **sh_reverse_last_sig_coeff_flag** | u(1) |
| if( pps_slice_header_extension_present_flag ) { | |
| **sh_slice_header_extension_length** | ue(v) |

Figure 5:
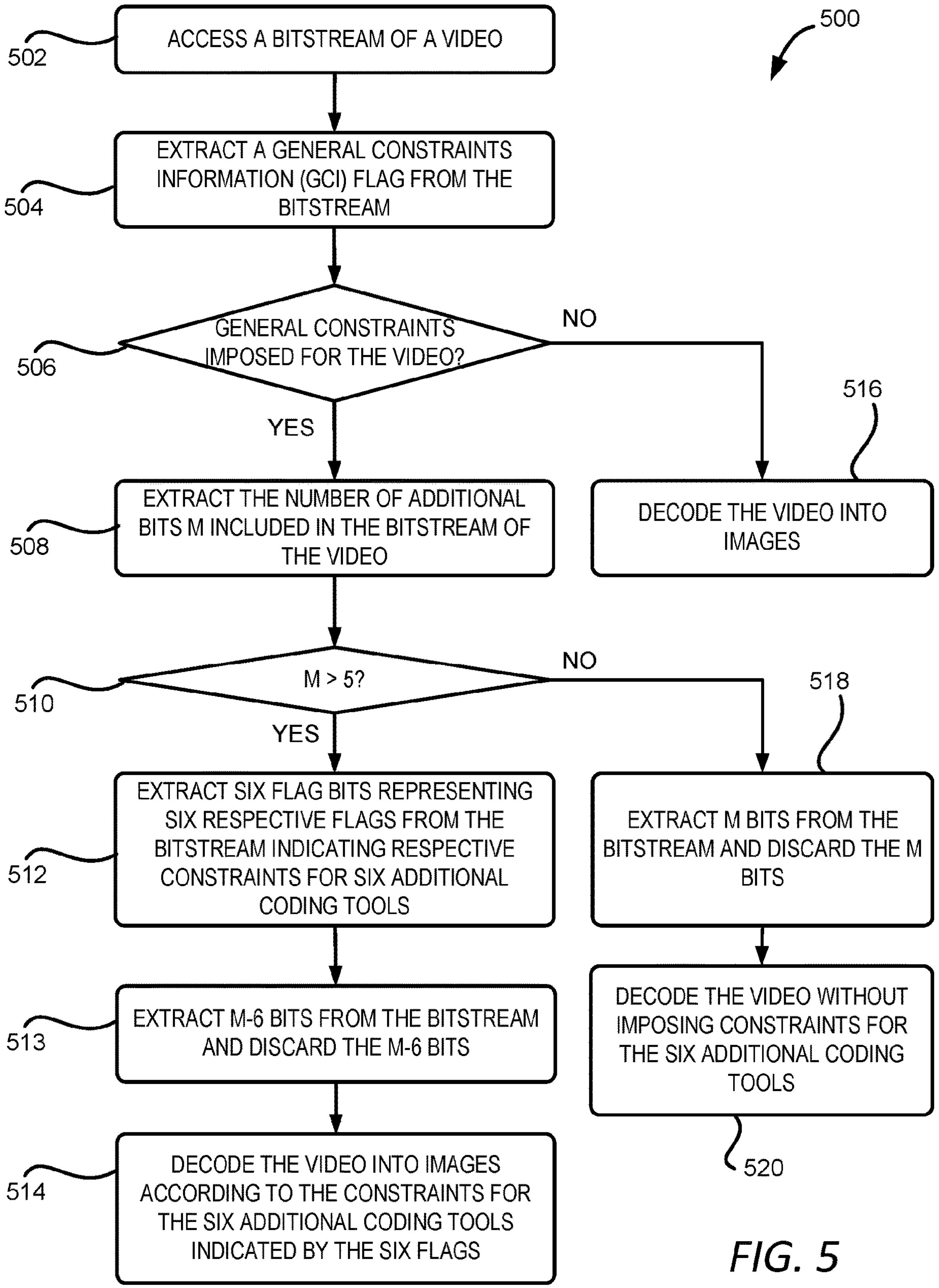
FIG. 5 depicts an example of a process for decoding a video according to some embodiments of the present disclosure.

FIG. 5 depicts an example of a process 500 for decoding a video, according to some embodiments of the present disclosure. One or more computing devices implement operations depicted in FIG. 5 by executing suitable program code. For example, a computing device implementing the video decoder 200 may implement the operations depicted in FIG. 5 by executing the program code, including, for example, the entropy decoding module 216, the inverse quantization module 218, the inverse transform module 219, the in-loop filter module 220, the inter prediction module 224, and the intra prediction module 226. For illustrative purposes, the process 500 is described with reference to some examples depicted in the figures. Other implementations, however, are possible.

At block 502, the process 500 involves accessing a bitstream of a video signal, such as the encoded video 202. At block 504, the process 500 involves extracting a general constraints information (GCI) flag from a bitstream of the video. As discussed above, this binary flag gci_present_flag is used to specify if GCI syntax elements are present or not. gci_present_flag equal to 1 specifies that GCI syntax elements are present in the general_constraints_info( ) syntax structure and are used to indicate the constraints imposed on additional coding tools. gci_present_flag equal to 0 specifies that GCI syntax elements are not present and general constraints are not imposed for the video. Depending on the encoder, the GCI flag may be extracted from a network packet of the video, a video parameter set of the video, or a sequence parameter set of the video.

At block 506, the process 500 involves determining whether one or more general constraints are imposed for the video based on the value of the GCI flag. If so (i.e., the GCI flag is 1), at block 508, the process 500 involves extracting, from the bitstream of the video, a value M representing the number of additional bits included in the bitstream of the video. These additional bits include flag bits indicating respective additional coding tools to be constrained for the video.

At block 510, the process 500 involves determining whether M>5. If so, at block 512, the process 500 involves extracting from the bitstream six flag bits representing the respective flags indicating respective constraints for six additional coding tools. The six flags include a flag gci_all_rap_pictures_constraint_flag indicating a restriction on pictures of the video to be either Intra random access point (IRAP) pictures or gradual decoder refresh (GDR) pictures, a flag gci_no_extended_precision_processing_constraint_flag indicating whether an extended transform precision is constrained, a flag gci_no_ts_residual_coding_rice_constraint_flag indicating whether an explicit Rice parameter signaling is constrained, a flag gci_no_rrc_rice_extension_constraint_flag indicating an alternative Rice parameter derivation for binarization of quantization residuals of the video, a flag gci_no_persistent_rice_adaptation_constraint_flag indicating whether to initialize Rice parameter derivation for binarization based on previous transform units, and a flag gci_no_reverse_last_sig_coeff_constraint_flag indicating whether to impose a constraint on pictures in OlsInScope when decoding the position of last non-zero level in a TU.

If M is larger than 6, the process 500 involves, at block 513, extracting the remaining M−6 bits from the bitstream and discarding them. In other words, the decoding of the video will be performed independent of the M−6 bits.

At block 514, the process 500 involves decoding the remaining portion of the bitstream of the video into images according to the constraints for the six additional coding tools indicated by the six flags. For example, if flag gci_all_rap_pictures_constraint_flag is 1, the decoder can determine that all pictures in one or more output layer sets are GDR pictures with ph_recovery_poc_cnt equal to 0 or IRAP pictures and decodes the GDR pictures or IRAP pictures in the one or more output layer sets. If the flag gci_no_extended_precision_processing_constraint_flag is 1, the decoder can determine that an extended transform precision is constrained and decodes the video by setting sps_extended_precision_flag for pictures in OlsInScope be equal to 0 so that extended dynamic range is not used. If the flag gci_no_ts_residual_coding_rice_constraint_flag is 1, the decoder can determine that an explicit Rice parameter signaling is constrained and decodes the remaining portion of the bitstream of the video by disabling alternative Rice parameter signaling for pictures in the OlsInScope. If the flag gci_no_rrc_rice_extension_constraint_flag is 1, the decoder can determine that an alternative Rice parameter derivation for binarization of quantization residuals of the video is constrained and decodes the remaining portion of the bitstream of the video by disabling alternative Rice parameter signaling for pictures in the OlsInScope. If the flag gci_no_persistent_rice_adaptation_constraint_flag is 1, the decoder can determine that an initialization of Rice parameter derivation for binarization based on previous transform unit state is constrained and decodes the remaining portion of the bitstream of the video without initializing Rice parameter based on previous transform unit state for pictures in the OlsInScope. If the flag gci_no_reverse_last_sig_coeff_constraint_flag is 1, the decoder can determine that sps_reverse_last_sig_coeff_enabled_flag for all pictures in OlsInScope is equal to 0 and that the coordinates of the last significant coefficient are coded relative to the top-left corner (0, 0) for each transform block of the current slice and decoding the remaining portion of the bitstream of the video by interpreting the decoded coordinates of the last significant coefficient as being relative to the top-left corner (0, 0) for each transform block of the current slice.

If at block 510 it is determined that M is not greater than 5, the process 500 involves, at block 518, extracting M bits from the bitstream and discarding them. In other words, the decoding of the video will be performed independent of the M bits. At block 520, the decoder decodes the video without imposing constraints for the six additional coding tools. If at block 506 it is determined that the GCI flag indicates that no general constraints are imposed for the video (i.e., GCI flag is 0), the process 500 involves decoding the video into images with no general constraints. In some examples, the decoding is performed according to the process described above with respect to FIG. 2. The decoded video can be output for display.

Figure 6:
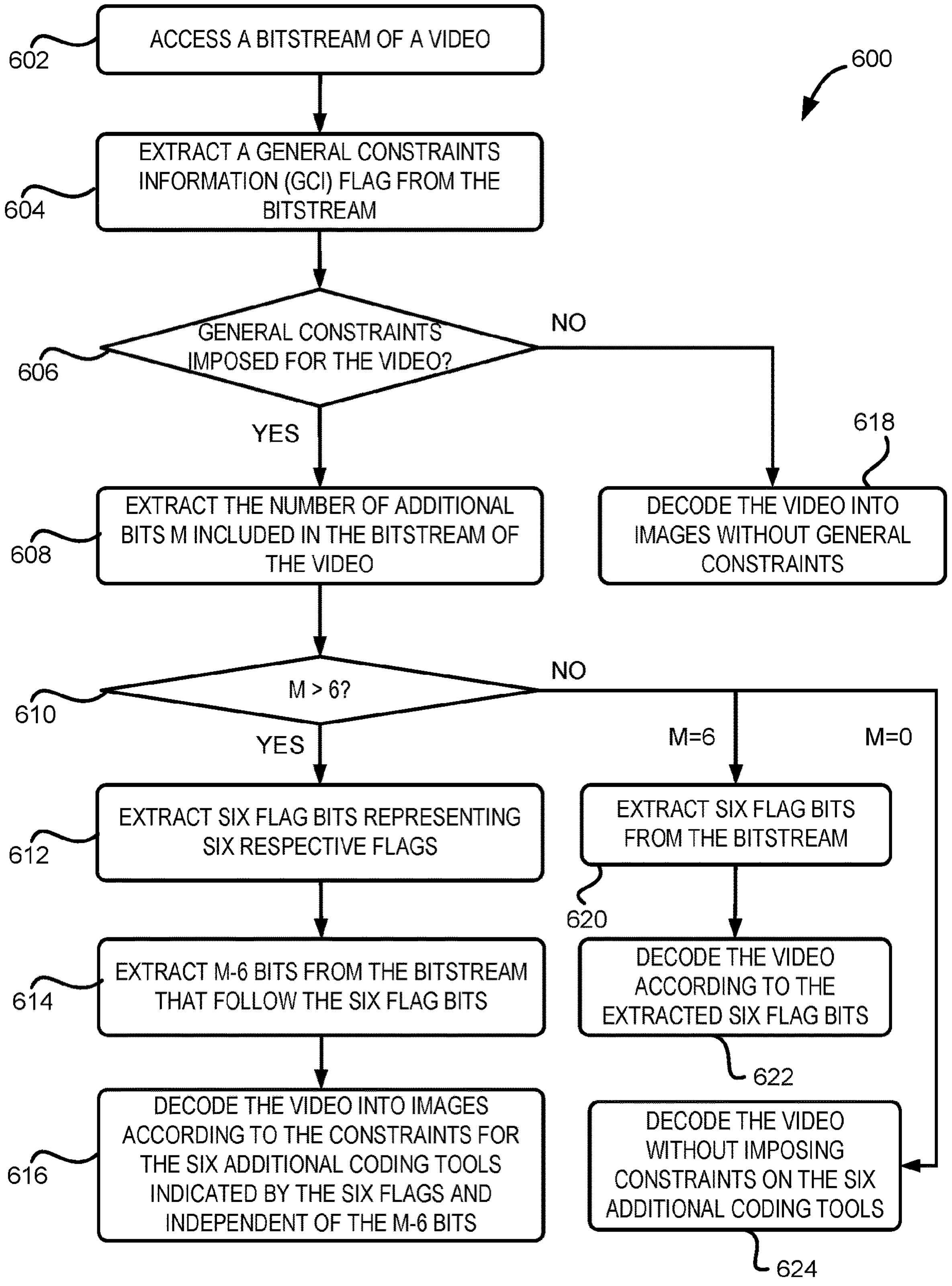
FIG. 6 depicts another example of a process for decoding a video, according to some embodiments of the present disclosure.

FIG. 6 depicts another example of a process 600 for decoding a video, according to some embodiments of the present disclosure. One or more computing devices implement operations depicted in FIG. 6 by executing suitable program code. For example, a computing device implementing the video decoder 200 may implement the operations depicted in FIG. 6 by executing the program code, including, for example, the entropy decoding module 216, the inverse quantization module 218, the inverse transform module 219, the in-loop filter module 220, the inter prediction module 224, and the intra prediction module 226. For illustrative purposes, the process 600 is described with reference to some examples depicted in the figures. Other implementations, however, are possible.

At block 602, the process 600 involves accessing a bitstream of a video signal, such as the encoded video 202. At block 604, the process 600 involves extracting a general constraints information (GCI) flag from a bitstream of the video. As discussed above, this binary flag gci_present_flag is used to specify if GCI syntax elements are present or not. gci_present_flag equal to 1 specifies that GCI syntax elements are present in the general_constraints_info( ) syntax structure and are used to indicate the constraints imposed on additional coding tools. gci_present_flag equal to 0 specifies that GCI syntax elements are not present and general constraints are not imposed for the video. Depending on the encoder, the GCI flag may be extracted from a network packet of the video, a video parameter set of the video, or a sequence parameter set of the video.

At block 606, the process 600 involves determining whether one or more general constraints are imposed for the video based on the value of the GCI flag. If so (i.e., the GCI flag is 1), at block 608, the process 600 involves extracting, from the bitstream of the video, a value M representing the number of additional bits included in the bitstream of the video. These additional bits include flag bits indicating respective additional coding tools to be constrained for the video.

At block 610, the process 600 involves determining whether M is greater than 6. If so, at block 612, the process 600 involves extracting from the bitstream six flag bits representing the respective flags indicating respective constraints for six additional coding tools. The six flags include a flag gci_all_rap_pictures_constraint_flag indicating a restriction on pictures of the video to be either Intra random access point (IRAP) pictures or gradual decoder refresh (GDR) pictures, a flag gci_no_extended_precision_processing_constraint_flag indicating whether an extended transform precision is constrained, a flag gci_no_ts_residual_coding_rice_constraint_flag indicating whether an explicit Rice parameter signaling is constrained, a flag gci_no_rrc_rice_extension_constraint_flag indicating an alternative Rice parameter derivation for binarization of quantization residuals of the video, a flag gci_no_persistent_rice_adaptation_constraint_flag indicating whether to initialize Rice parameter derivation for binarization based on previous transform units, and a flag gci_no_reverse_last_sig_coeff_constraint_flag indicating whether to impose a constraint on pictures in OlsInScope when decoding the position of last non-zero level in a TU.

At block 614, the process 600 involves extracting, from the bitstream, M−6 bits that follow the six flag bits and discarding the extracted M−6 bits. In other words, the decoding of the video will be performed independent of the M−6 bits. At block 616, the process 600 involves decoding the remaining portion of the bitstream of the video into images according to the constraints for the six additional coding tools indicated by the six flags. For example, if flag gci_all_rap_pictures_constraint_flag is 1, the decoder can determine that all pictures in one or more output layer sets are GDR pictures with ph_recovery_poc_cnt equal to 0 or IRAP pictures and decodes the GDR pictures or IRAP pictures in the one or more output layer sets. If the flag gci_no_extended_precision_processing_constraint_flag is 1, the decoder can determine that an extended transform precision is constrained and decodes the video by setting sps_extended_precision_flag for pictures in OlsInScope be equal to 0 so that extended dynamic range is not used. If the flag gci_no_ts_residual_coding_rice_constraint_flag is 1, the decoder can determine that an explicit Rice parameter signaling is constrained and decodes the remaining portion of the bitstream of the video by disabling alternative Rice parameter signaling for pictures in the OlsInScope. If the flag gci_no_rrc_rice_extension_constraint_flag is 1, the decoder can determine that an alternative Rice parameter derivation for binarization of quantization residuals of the video is constrained and decodes the remaining portion of the bitstream of the video by disabling alternative Rice parameter signaling for pictures in the OlsInScope. If the flag gci_no_persistent_rice_adaptation_constraint_flag is 1, the decoder can determine that an initialization of Rice parameter derivation for binarization based on previous transform unit state is constrained and decodes the remaining portion of the bitstream of the video without initializing Rice parameter based on previous transform unit state for pictures in the OlsInScope. If the flag gci_no_reverse_last_sig_coeff_constraint_flag is 1, the decoder can determine that sps_reverse_last_sig_coeff_enabled_flag for all pictures in OlsInScope is equal to 0 and that the coordinates of the last significant coefficient are coded relative to the top-left corner (0, 0) for each transform block of the current slice and decoding the remaining portion of the bitstream of the video by interpreting the decoded coordinates of the last significant coefficient as being relative to the top-left corner (0, 0) for each transform block of the current slice.

If at block 610 it is determined that M is not greater than 6, M is either 0 or 6. If M is 6, the process 600 involves, at block 620, extracting the six flag bits. as discussed above. At block 622, the decoder decodes the video according to the extracted flag bits by imposing constraints for the six additional coding tools. If M is 0, then no flag bits are extracted. At block 624, the decoder decodes the video by imposing no constraints on the six additional coding tools because no flag bits are extracted. If at block 606 it is determined that the GCI flag indicates that no general constraints are imposed for the video (i.e., GCI flag is 0), the process 600 involves, at block 618, decoding the video into images with no general constraints. In some examples, the decoding is performed according to the process described above with respect to FIG. 2. The decoded video can be output for display.

Figure 7:
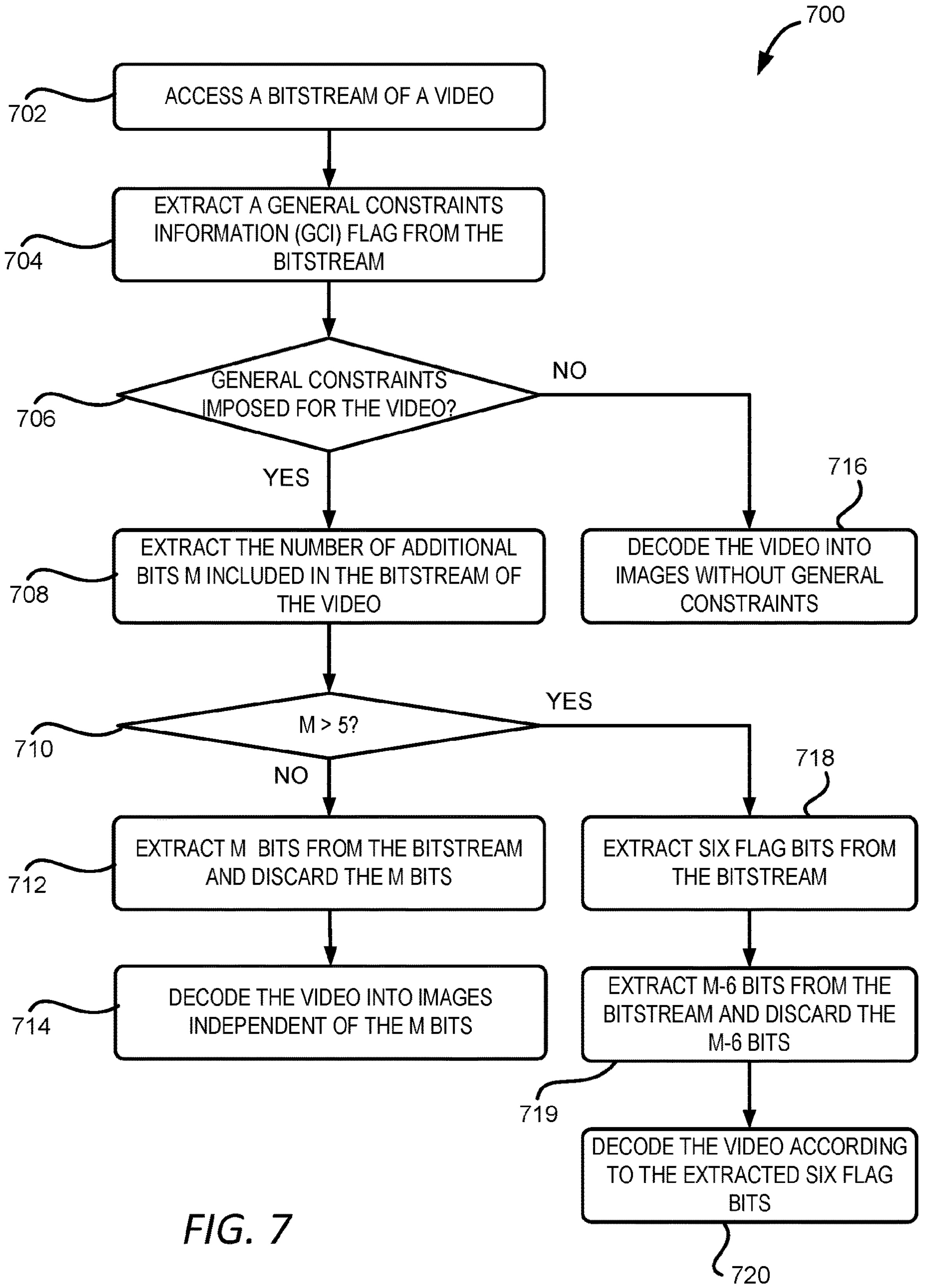
FIG. 7 depicts another example of a process for decoding a video according to some embodiments of the present disclosure.

FIG. 7 depicts another example of a process 700 for decoding a video, according to some embodiments of the present disclosure. One or more computing devices implement operations depicted in FIG. 7 by executing suitable program code. For example, a computing device implementing the video decoder 200 may implement the operations depicted in FIG. 7 by executing the program code, including, for example, the entropy decoding module 216, the inverse quantization module 218, the inverse transform module 219, the in-loop filter module 220, the inter prediction module 224, and the intra prediction module 226. For illustrative purposes, the process 700 is described with reference to some examples depicted in the figures. Other implementations, however, are possible.

At block 702, the process 700 involves accessing a bitstream of a video signal, such as the encoded video 202. At block 704, the process 700 involves extracting a general constraints information (GCI) flag from a bitstream of the video. As discussed above, this binary flag gci_present_flag is used to specify if GCI syntax elements are present or not. gci_present_flag equal to 1 specifies that GCI syntax elements are present in the general_constraints_info( ) syntax structure and are used to indicate the constraints imposed on additional coding tools. gci_present_flag equal to 0 specifies that GCI syntax elements are not present and general constraints are not imposed for the video. Depending on the encoder, the GCI flag may be extracted from a network packet of the video, a video parameter set of the video, or a sequence parameter set of the video.

At block 706, the process 700 involves determining whether one or more general constraints are imposed for the video based on the value of the GCI flag. If so (i.e., the GCI flag is 1), at block 708, the process 700 involves extracting, from the bitstream of the video, a value M representing the number of additional bits included in the bitstream of the video. These additional bits include flag bits indicating respective additional coding tools to be constrained for the video.

At block 710, the process 700 involves determining whether M is greater than 5. If not, at block 712, the process 700 involves extracting M bits from the bitstream and discard the M bits. At block 714, the process 700 involves decoding the remaining portion of the bitstream of the video into images independent of the M bits. If at block 710 it is determined that M is not greater than 5, the process 700 involves, at block 718, extracting the six flag bits as discussed above. If M is larger than 6, the process 700 involves, at block 719, extracting the remaining M−6 bits from the bitstream and discarding them. In other words, the decoding of the video will be performed independent of the M−6 bits. At block 720, the decoder decodes the video according to the extracted six flag bits by imposing constraints for the six additional coding tools as discussed above.

If at block 706 it is determined that the GCI flag indicates that no general constraints are imposed for the video (i.e., GCI flag is 0), the process 700 involves decoding the video into images with no general constraints. In some examples, the decoding is performed according to the process described above with respect to FIG. 2. The decoded video can be output for display.

Figure 8:
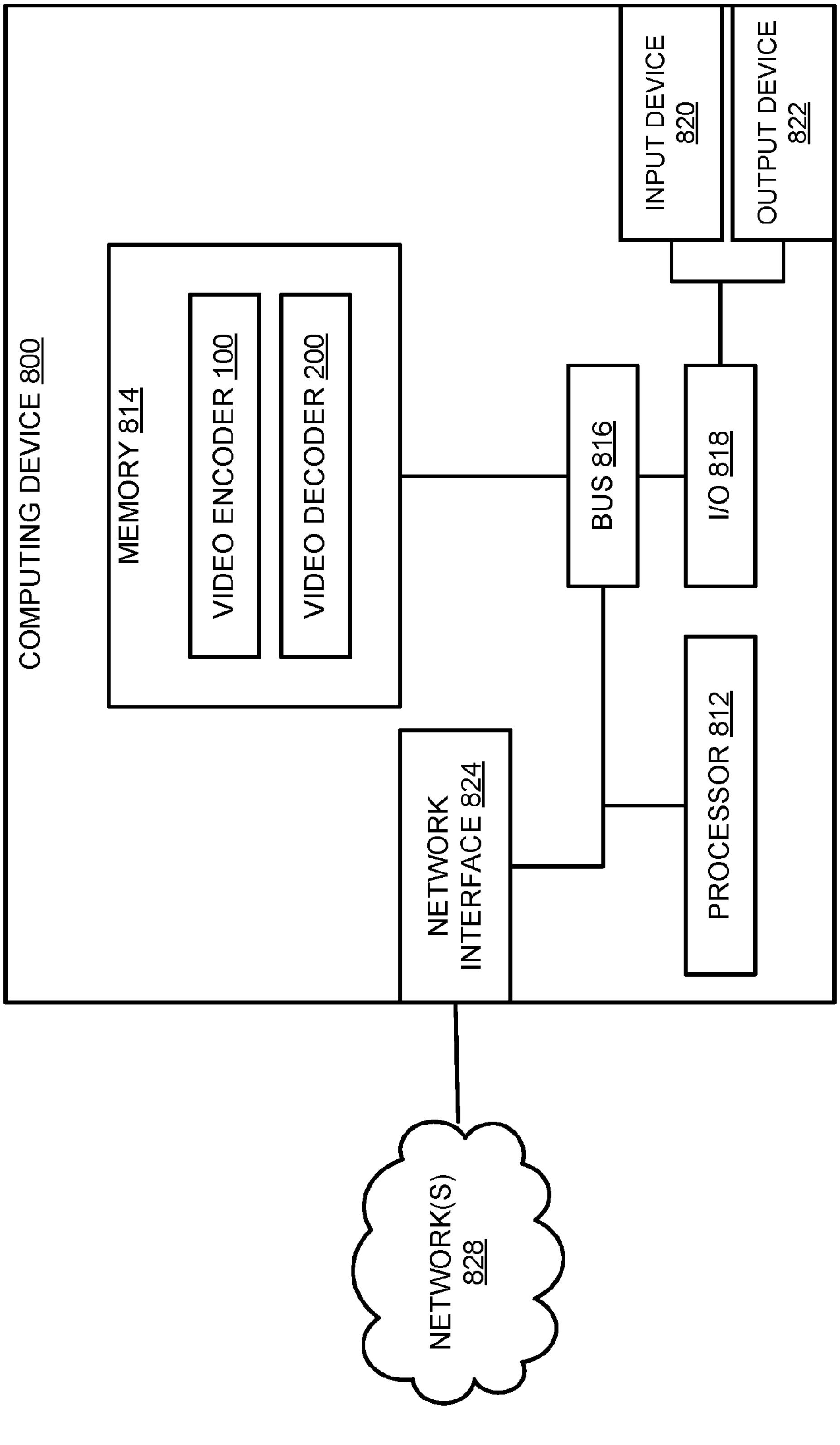
FIG. 8 depicts an example of a computing system that can be used to implement some embodiments of the present disclosure.

Computing System Example for Implementing Signaling General Constraints Information Any suitable computing system can be used for performing the operations described herein. For example, FIG. 8 depicts an example of a computing device 800 that can implement the video encoder 100 of FIG. 1 or the video decoder 200 of FIG. 2. In some embodiments, the computing device 800 can include a processor 812 that is communicatively coupled to a memory 814 and that executes computer-executable program code and/or accesses information stored in the memory 814. The processor 812 may comprise a microprocessor, an application-specific integrated circuit ("ASIC"), a state machine, or other processing device. The processor 812 can include any of a number of processing devices, including one. Such a processor can include or may be in communication with a computer-readable medium storing instructions that, when executed by the processor 812, cause the processor to perform the operations described herein.

The memory 814 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 800 can also include a bus 816. The bus 816 can communicatively couple one or more components of the computing device 800. The computing device 800 can also include a number of external or internal devices such as input or output devices. For example, the computing device 800 is shown with an input/output ("I/O") interface 818 that can receive input from one or more input devices 820 or provide output to one or more output devices 822. The one or more input devices 820 and one or more output devices 822 can be communicatively coupled to the I/O interface 818. The communicative coupling can be implemented via any suitable manner (e.g., a connection via a printed circuit board, connection via a cable, communication via wireless transmissions, etc.). Non-limiting examples of input devices 820 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 822 include an LCD screen, an external monitor, a speaker, or any other device that can be used to display or otherwise present outputs generated by a computing device.

The computing device 800 can execute program code that configures the processor 812 to perform one or more of the operations described above with respect to FIGS. 1-7. The program code can include the video encoder 100 or the video decoder 200. The program code may be resident in the memory 814 or any suitable computer-readable medium and may be executed by the processor 812 or any other suitable processor.

The computing device 800 can also include at least one network interface device 824. The network interface device 824 can include any device or group of devices suitable for establishing a wired or wireless data connection to one or more data networks 828. Non-limiting examples of the network interface device 824 include an Ethernet network adapter, a modem, and/or the like. The computing device 800 can transmit messages as electronic or optical signals via the network interface device 824.

General Considerations

Numerous details are set forth herein to provide a thorough understanding of the claimed subject matter. However, those skilled in the art will understand that the claimed subject matter may be practiced without these details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Some blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for decoding a video, performed by a video decoder, the method comprising:

extracting a general constraints information (GCI) flag from a bitstream of the video;

determining that one or more general constraints are imposed for the video based on a value of the GCI flag;

in response to determining that one or more general constraints are imposed for the video, extracting, from the bitstream of the video, a value indicating a quantity of additional bits included in the bitstream of the video, the additional bits comprising flag bits indicating respective additional coding tools to be constrained for the video;

determining that the value is no greater than 5; and in response to determining that the value is no greater than 5, extracting one or more bits from the bitstream, wherein a number of the one or more bits equals to the value, and decoding a remaining portion of the bitstream of the video into images independent of the one or more bits.

2. The method of claim 1, further comprising:

in response to determining that the value is greater than 5, determining that there are six flag bits in the bitstream of the video representing six respective flags indicating respective constraints for six additional coding tools;

extracting the six flag bits from the bitstream; and decoding the remaining portion of the bitstream of the video into images based, at least in part, upon the constraints for the six additional coding tools indicated by the six flag bits.

3. The method of claim 2, wherein the six flags comprise:

a first flag indicating a restriction on pictures of the video to be either Intra random access point (IRAP) pictures or gradual decoder refresh (GDR) pictures;

a second flag indicating whether an extended transform precision is constrained;

a third flag indicating whether an explicit Rice parameter signaling is constrained;

a fourth flag indicating an alternative Rice parameter derivation for binarization of quantization residuals of the video;

a fifth flag indicating whether to initialize Rice parameter derivation for binarization based on previous transform units; and a sixth flag indicating whether to impose a constraint on pictures in an in-scope output layer set OlsInScope when decoding a position of a last non-zero level in a transform unit.

4. The method of claim 3, further comprising one or more of:

determining that the first flag is not present in the bitstream and inferring a value of the first flag to be 0 indicating no constraint is imposed for a corresponding coding tool;

determining that the second flag is not present in the bitstream and inferring a value of the second flag to be 0 indicating no constraint is imposed for a corresponding coding tool;

determining that the third flag is not present in the bitstream and inferring a value of the third flag to be 0 indicating no constraint is imposed for a corresponding coding tool;

determining that the fourth flag is not present in the bitstream and inferring a value of the fourth flag to be 0 indicating no constraint is imposed for a corresponding coding tool;

determining that the fifth flag is not present in the bitstream and inferring a value of the fifth flag to be 0 indicating no constraint is imposed for a corresponding coding tool; or determining that the sixth flag is not present in the bitstream and inferring a value of the sixth flag to be 0 indicating no constraint is imposed for a corresponding coding tool.

5. The method of claim 3, wherein decoding the remaining portion of the bitstream of the video into images based, at least in part, upon the constraints for the six additional coding tools indicated by the six flags comprises one or more of:

determining all pictures in one or more output layer sets are GDR pictures with ph_recovery_poc_cnt equal to 0 or IRAP pictures based on the value of the first flag being one, and decoding the GDR pictures or IRAP pictures in the one or more output layer sets;

determining that an extended transform precision is constrained based on the second flag being one and decoding the remaining portion of the bitstream of the video by setting sps_extended_precision_flag for pictures in OlsInScope be equal to 0 so that extended dynamic range is not used;

determining that an explicit Rice parameter signaling is constrained based on the third flag being one, and decoding the remaining portion of the bitstream of the video by disabling alternative Rice parameter signaling for pictures in the OlsInScope;

determining that an alternative Rice parameter derivation for binarization of quantization residuals of the video is constrained based on the fourth flag being one, and decoding the remaining portion of the bitstream of the video by disabling alternative Rice parameter signaling for pictures in the OlsInScope;

determining that an initialization of Rice parameter derivation for binarization based on previous transform unit state is constrained based on determining the fifth flag being one, and decoding the remaining portion of the bitstream of the video without initializing Rice parameter based on previous transform unit state for pictures in the OlsInScope; or determining that coordinates of a last significant coefficient are coded relative to a top-left corner for each transform block of a slice based on the sixth flag being one and decoding the remaining portion of the bitstream of the video by interpreting decoded coordinates of the last significant coefficient as being relative to the top-left corner for each transform block of the slice.

6. The method of claim 1, wherein the GCI flag is extracted from a network packet of the video, a video parameter set of the video, or a sequence parameter set of the video.

7. The method of claim 1, further comprising:

in response to determining that the value is greater than five, setting a value numAdditionalBitsUsed indicating extracted additional bits to be 6;

extracting a set of bits from the bitstream, wherein a number of bits in the set of bits equals to gci_num_additional_bits−numAdditionalBitsUsed, gci_num_additional_bits representing the value; and decoding the remaining portion of the bitstream of the video into images independent of the set of bits.

8. A non-transitory computer-readable medium having program code that is stored thereon, the program code executable by one or more processing devices for performing operations comprising:

extracting a general constraints information (GCI) flag from a bitstream of the video;

determining that one or more general constraints are imposed for the video based on a value of the GCI flag;

in response to determining that one or more general constraints are imposed for the video, extracting, from the bitstream of the video, a value indicating a quantity of additional bits included in the bitstream of the video, the additional bits comprising flag bits indicating respective additional coding tools to be constrained for the video;

determining that the value is no greater than 5; and in response to determining that the value is no greater than 5, extracting one or more bits from the bitstream, wherein a number of the one or more bits equals to the value, and decoding a remaining portion of the bitstream of the video into images independent of the one or more bits.

9. The non-transitory computer-readable medium of claim 8, wherein the operations further comprise:

in response to determining that the value is greater than 5, determining that there are six flag bits in the bitstream of the video representing six respective flags indicating respective constraints for six additional coding tools;

extracting the six flag bits from the bitstream; and decoding the remaining portion of the bitstream of the video into images based, at least in part, upon the constraints for the six additional coding tools indicated by the six flag bits.

10. The non-transitory computer-readable medium of claim 9, wherein the six flags comprise:

a first flag indicating a restriction on pictures of the video to be either Intra random access point (IRAP) pictures or gradual decoder refresh (GDR) pictures;

a second flag indicating whether an extended transform precision is constrained;

a third flag indicating whether an explicit Rice parameter signaling is constrained;

a fourth flag indicating an alternative Rice parameter derivation for binarization of quantization residuals of the video;

a fifth flag indicating whether to initialize Rice parameter derivation for binarization based on previous transform units; and a sixth flag indicating whether to impose a constraint on pictures in an in-scope output layer set OlsInScope when decoding a position of a last non-zero level in a transform unit.

11. The non-transitory computer-readable medium of claim 10, wherein the operations further comprise one or more of:

determining that the first flag is not present in the bitstream and inferring a value of the first flag to be 0 indicating no constraint is imposed for a corresponding coding tool;

determining that the second flag is not present in the bitstream and inferring a value of the second flag to be 0 indicating no constraint is imposed for a corresponding coding tool;

determining that the third flag is not present in the bitstream and inferring a value of the third flag to be 0 indicating no constraint is imposed for a corresponding coding tool;

determining that the fourth flag is not present in the bitstream and inferring a value of the fourth flag to be 0 indicating no constraint is imposed for a corresponding coding tool;

determining that the fifth flag is not present in the bitstream is not present and inferring a value of the fifth flag to be 0 indicating no constraint is imposed for a corresponding coding tool; or determining that the sixth flag is not present in the bitstream and inferring a value of the sixth flag to be 0 indicating no constraint is imposed for a corresponding coding tool.

12. The non-transitory computer-readable medium of claim 10, wherein decoding the remaining portion of the bitstream of the video into images based, at least in part, upon the constraints for the six additional coding tools indicated by the six flags comprises one or more of:

determining all pictures in one or more output layer sets are GDR pictures with ph_recovery_poc_cnt equal to 0 or IRAP pictures based on the value of the first flag being one, and decoding the GDR pictures or IRAP pictures in the one or more output layer sets;

determining that an extended transform precision is constrained based on the second flag being one and decoding the remaining portion of the bitstream of the video by setting sps_extended_precision_flag for pictures in OlsInScope be equal to 0 so that extended dynamic range is not used;

determining that an explicit Rice parameter signaling is constrained based on the third flag being one, and decoding the remaining portion of the bitstream of the video by disabling alternative Rice parameter signaling for pictures in the OlsInScope;

determining that an alternative Rice parameter derivation for binarization of quantization residuals of the video is constrained based on the fourth flag being one, and decoding the remaining portion of the bitstream of the video by disabling alternative Rice parameter signaling for pictures in the OlsInScope;

determining that an initialization of Rice parameter derivation for binarization based on previous transform unit state is constrained based on determining the fifth flag being one, and decoding the remaining portion of the bitstream of the video without initializing Rice parameter based on previous transform unit state for pictures in the OlsInScope; or determining that coordinates of a last significant coefficient are coded relative to a top-left corner for each transform block of a slice based on the sixth flag being one and decoding the remaining portion of the bitstream of the video by interpreting decoded coordinates of the last significant coefficient as being relative to the top-left corner for each transform block of the slice.

13. The non-transitory computer-readable medium of claim 8, wherein the GCI flag is extracted from a network packet of the video, a video parameter set of the video, or a sequence parameter set of the video.

14. The non-transitory computer-readable medium of claim 8, wherein the operations further comprise:

in response to determining that the value is greater than five, setting a value numAdditionalBitsUsed indicating extracted additional bits to be 6;

extracting a set of bits from the bitstream, wherein a number of bits in the set of bits equals to gci_num_additional_bits−numAdditionalBitsUsed, gci_num_additional_bits representing the value; and decoding the remaining portion of the bitstream of the video into images independent of the set of bits.

15. A method for encoding a video, performed by a video encoder, the method comprising:

determining a general constraints information (GCI) flag;

determining that one or more general constraints are imposed for the video based on a value of the GCI flag;

in response to determining that one or more general constraints are imposed for the video, determining a value indicating a quantity of additional bits, the additional bits comprising flag bits indicating respective additional coding tools to be constrained for the video;

determining that the value is no greater than 5; and in response to determining that the value is no greater than 5, determining one or more bits, wherein a number of the one or more bits equals to the value, and encoding the GCI flag, the value, and the one or more bits into a bitstream of the video, wherein a remaining portion of the bitstream of the video is independent of the one or more bits.

16. A non-transitory computer-readable medium storing computer programs and a bitstream, wherein when executed by a processor, the computer programs cause the processor to perform the method of claim 15 to generate the bitstream.

* * * * *